US012410967B2

(12) United States Patent
Lim et al.

(10) Patent No.: US 12,410,967 B2
(45) Date of Patent: Sep. 9, 2025

(54) DOOR OPENING DEVICE AND REFRIGERATOR HAVING THE SAME

(71) Applicant: SAMSUNG ELECTRONICS CO., LTD., Suwon-si (KR)

(72) Inventors: Suhyeong Lim, Suwon-si (KR); Changgu Kang, Suwon-si (KR); Hyunsung Jeong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 186 days.

(21) Appl. No.: 17/968,390

(22) Filed: Oct. 18, 2022

(65) Prior Publication Data

US 2023/0204278 A1 Jun. 29, 2023

Related U.S. Application Data

(63) Continuation of application No. PCT/KR2022/013538, filed on Sep. 8, 2022.

(30) Foreign Application Priority Data

Dec. 23, 2021 (KR) ........................ 10-2021-0185790

(51) Int. Cl.
*F25D 23/02* (2006.01)
*E05B 1/00* (2006.01)
(Continued)

(52) U.S. Cl.
CPC ......... *F25D 23/028* (2013.01); *F25D 25/025* (2013.01); *E05B 17/0033* (2013.01); (Continued)

(58) Field of Classification Search
CPC .... F25D 23/028; F25D 25/025; F25D 23/021; E05Y 2900/31; E05F 11/54; E05B 17/0033
See application file for complete search history.

(56) References Cited

U.S. PATENT DOCUMENTS 7,984,955 B2 * 7/2011 Jung ..................... F25D 23/028 312/319.2
8,328,301 B2 * 12/2012 Lee ..................... E05B 17/0033 292/336.3
(Continued)

FOREIGN PATENT DOCUMENTS

CN 105466101 4/2016
EP 2 299 213 A2 3/2011
(Continued)

OTHER PUBLICATIONS

International Search Report dated Jan. 10, 2023 in International Patent Application No. PCT/KR2022/013538 (3 pages; 3 pages English translation).
(Continued)

*Primary Examiner* — Kimberley S Wright
(74) *Attorney, Agent, or Firm* — STAAS & HALSEY LLP

(57) ABSTRACT

A door opening device for opening a drawer type door of a refrigerator includes: a handle lever rotatably assembled with a door cap and including a rotating and pressing portion; a transfer lever positioned behind the handle lever to rotate by the handle lever, and including a sliding surface inclined such that the rotating and pressing portion slidingly moves according to a rotation of the handle lever; and a slider assembled with a rear portion of the transfer lever in such a way as to be linearly movable, and configured to linearly move toward a rear direction according to a rotation of the transfer lever to press the main body, thereby opening the drawer type door.

14 Claims, 23 Drawing Sheets

(51) Int. Cl.

| | |
|---|---|
| ***E05B 17/00*** | (2006.01) |
| ***E05F 11/54*** | (2006.01) |
| ***F25D 25/02*** | (2006.01) |
| *F25D 11/02* | (2006.01) |

(52) U.S. Cl.

CPC ........... *E05F 11/54* (2013.01); *E05Y 2900/31* (2013.01); *F25D 11/02* (2013.01); *F25D 23/02* (2013.01); *F25D 23/021* (2013.01)

(56) References Cited

U.S. PATENT DOCUMENTS

| | | | | |
|---|---|---|---|---|
| 9,127,879 | B2 * | 9/2015 | Hwang | F25D 23/00 |
| 9,506,685 | B2 * | 11/2016 | Park | F25D 23/028 |
| 9,897,368 | B2 * | 2/2018 | Lee | F25D 23/028 |
| 10,527,342 | B2 * | 1/2020 | Park | E05F 11/54 |
| 2009/0205357 | A1 | 8/2009 | Lim et al. | |
| 2012/0280608 | A1 * | 11/2012 | Park | E05B 1/0015 49/460 |
| 2013/0270990 | A1 * | 10/2013 | Park | F25D 23/028 312/405 |
| 2014/0319989 | A1 * | 10/2014 | Hwang | F25D 23/028 312/405 |
| 2015/0292793 | A1 | 10/2015 | Bischoff et al. | |
| 2017/0336131 | A1 * | 11/2017 | Lee | E05F 11/10 |
| 2019/0024965 | A1 * | 1/2019 | Park | F25D 23/028 |

FOREIGN PATENT DOCUMENTS

| | | |
|---|---|---|
| EP | 2 653 810 A2 | 10/2013 |
| JP | 2004-116842 | 4/2004 |
| KR | 10-0182734 | 5/1999 |
| KR | 10-2011-0064720 | 6/2011 |
| KR | 10-2013-0053921 | 5/2013 |
| KR | 10-2013-0116738 | 10/2013 |
| KR | 10-1510759 | 4/2015 |
| KR | 10-1528729 | 6/2015 |
| KR | 10-2017-0129541 | 11/2017 |
| KR | 10-1897275 | 9/2018 |

OTHER PUBLICATIONS

PCT/ISA/237 dated Jan. 10, 2023 in International Patent Application. No. PCT/KR2022/013538 (4 pages).

Extended European Search Report dated Dec. 9, 2024 for European Application No. 22911509.2.

* cited by examiner

DOOR OPENING DEVICE AND REFRIGERATOR HAVING THE SAME

CROSS-REFERENCE TO RELATED APPLICATION

This application is continuation application, under 35 USC § 111(a) of International Application No. PCT/KR2022/013538, filed on Sep. 8, 2022, which claims priority to Korean Patent Application No. 10-2021-0185790, filed on Dec. 23, 2021 in the Korean Intellectual Property Office, the disclosure of which is incorporated by reference herein in its entirety.

BACKGROUND

1. Field

The disclosure relates to a refrigerator having an improved door opening device for opening a drawer type door with a recess type handle.

2. Description of the Related Art

A refrigerator is an appliance that includes a main body having a storage room and a cool air supply system for supplying cool air to the storage room to keep food fresh. The storage room includes a refrigerating room that is maintained at temperature of about 0° C. to about 5° C. to keep food refrigerated, and a freezing room that is maintained at temperature of about 0° C. to about −30° C. to keep food frozen. On the front side of the main body, a door is provided to open or close the storage room. The door is rotatably provided on the front side of the main body to open or close the storage room. Also, the door is provided as a drawer type door to open or close the storage room.

The drawer type door for opening or closing the storage room includes a handle which a user grips to push the drawer type door in or take the drawer type door out. The handle may be a recess type.

The storage room that is opened or closed by the drawer type door having the recess type handle stores different amounts of food therein according to the capacity. In the case in which the storage room stores a large amount of food, a user who grips the handle to take out the drawer type door should apply great strength. That is, a user should apply great strength to open the drawer type door being in a closed state in an operation of opening the drawer type door.

To enable a user to easily open the drawer type door, the drawer type door includes a door opening device for opening the drawer type door. By gripping the recess type handle of the drawer type door being in a closed state to operate the door opening device, the drawer type door opens by a certain gap and a user can easily open the drawer type door without applying great strength.

The door opening device includes a lever which a user can press while gripping the handle, and a slider operating by the lever to open the drawer type door. In a refrigerator having a structure capable of replacing a front panel of a drawer type door, the front panel needs to have a thin thickness due to a structure for assembling the front panel. To reduce the thickness of the front panel, a moving distance of the slider needs to be long compared to an operation of the lever pressed by a user. That is, a moving distance of the slider needs to be maximally long with a minimum operation of the lever within a thin thickness of the front panel.

Also, exposure of the door opening device that operates by being gripped by a user to the outside leads to damage in appearance, and accordingly, the door opening device needs to be prevented from being exposed.

SUMMARY

A refrigerator according to an embodiment of the disclosure includes: a main body; a storage room formed inside the main body and having an opening formed along a front side of the main body; a drawer type door couplable with the main body and slideable along the storage room, to open or close the opening of the storage room, the drawer type door including a door cap having a handle pocket; and a door opening device connectable with a portion of the door cap, and configured to open the drawer type door, wherein the door opening device includes: a handle lever connectable with the door cap, and including a rotating and pressing portion; a transfer lever positioned behind the handle lever and rotatable by the handle lever, the transfer level including a sliding surface inclined such that the rotating and pressing portion slides according to a rotation of the handle lever; and a slider connectable with a rear portion of the transfer lever in such a way as to be linearly movable, and configured to linearly move toward a rear direction according to a rotation of the transfer lever to press the main body, and thereby open the drawer type door.

A door bracket may be connectable with a center portion of a lower end of the door cap, and the door opening device may be connectable with the door bracket.

The door bracket may include a handle lever assembling portion to which the handle lever is rotatably connectable, a slider assembling portion with which the slider is connectable to in such a way as to be linearly movable, and a transfer lever assembling hole connectable to the transfer lever.

The slider assembling portion may include a guide protrusion configured to guide the slider to linearly move, and an opening of the slider assembling portion configured to enable the slider to linearly move to press the main body.

The door opening device may further include an elastic member of which one end is supported on the transfer lever and an other end is supported on the door bracket, the elastic member configured to return the handle lever to an original position upon removal of a force applied to the handle lever after the transfer lever rotates by the handle lever.

The door cap may include a first opening configured to expose a portion of the handle lever to the hand pocket, and a second opening formed at a location corresponding to the opening of the door bracket and configured to enable the slider to linearly move to open the drawer type door.

The handle lever may include a bracket of which a portion is exposed to the handle pocket, a reinforcing member connectable with the bracket and configured to reinforce the bracket, and a handle lever rotation shaft fixed to the reinforcing member and configured to enable the handle lever to be rotatably connectable with the door cap.

The bracket may include a grip portion exposed to the handle pocket, a plurality of catching hooks with which the reinforcing member is assembled, and the rotating and pressing portion being in contact with the sliding surface of the transfer lever.

An end of the rotating and pressing portion, which is in contact with the sliding surface, may be in a shape of a cylinder to be in linear contact with the sliding surface.

The slider may include a guide rail guided by the guide protrusion, a pushed portion configured to be pushed by the transfer lever to enable the slider to linearly move toward the main body, and a pressing portion configured to press the main body through the opening of the slider assembling portion upon a linear movement of the slider toward the main body to open the drawer type door.

The transfer lever may further include a transfer lever rotation shaft fixable to the transfer lever assembling hole, a rotation hole rotatably fixable to the transfer lever rotation shaft, a push portion configured to push the slider, and a first support protrusion on which the one end of the elastic member is supported, and the door bracket may further include a second support protrusion on which the other end of the elastic member is supported.

A center of the handle lever, a center of the transfer lever, and a center of the slider may be aligned along an axis.

The slider and the transfer lever may be provided at a left side and a right side of the door bracket with respect to a center of the door bracket.

The rotating and pressing portion of the handle lever may be provided as a pair of pieces to correspond to the transfer lever.

A center of the rotating and pressing portion, a center of the transfer lever, and a center of the slider may be aligned along an axis.

Also, a refrigerator according to an embodiment of the disclosure includes: a main body; a storage room formed inside the main body, wherein a front side of the storage room opens; a drawer type door slidingly coupled with the main body and configured to open or close the storage room; and a door opening device assembled with the drawer type door and configured to open the drawer type door, wherein the drawer type door includes: a door cap assembled with an upper portion of the drawer type door, wherein a handle pocket is formed in the door cap; and a door bracket with which the door opening device is assembled, the door bracket assembled with a lower end of the door cap and configured to prevent the door opening device from being exposed to outside.

The door opening device may include: a handle lever rotatably assembled with the door bracket and including a rotating and pressing portion; a slider configured to linearly move by the handle lever to open the drawer type door; and a transfer lever assembled with the door bracket and configured to rotate by the handle lever to push the slider.

The transfer lever may include a sliding surface inclined such that the rotating and pressing portion slidingly moves; and a push portion configured to push the slider, wherein, according to a rotation of the handle lever, the rotating and pressing portion slidingly moves along the sliding surface to rotate the transfer lever.

An end of the rotating and pressing portion, which is in contact with the sliding surface, may be in a shape of a cylinder to be in linear contact with the sliding surface.

Also, in a door opening device for opening a drawer type door, according to an embodiment of the disclosure, the drawer type door includes: a door cap assembled with an upper portion of the drawer type door, wherein a handle pocket is formed in the door cap; and a door bracket assembled with a lower end of the door cap, wherein the door opening device is assembled with the door bracket, the door opening device includes: a handle lever rotatably assembled with the door bracket; a transfer lever positioned behind the handle lever and assembled with the door bracket to rotate by the handle lever; and a slider configured to linearly move toward a rear direction by the transfer lever, thereby opening the drawer type door, and a contact surface of the transfer lever, which the handle lever contacts, is inclined such that the handle lever slidingly moves along the contact surface of the transfer lever according to a rotation of the handle lever.

BRIEF DESCRIPTION OF THE DRAWINGS

The above and other aspects, features, and advantages of certain embodiments of the present disclosure will become apparent from the following description taken in conjunction with the accompanying drawings of which.

DETAILED DESCRIPTION

Figure 1:
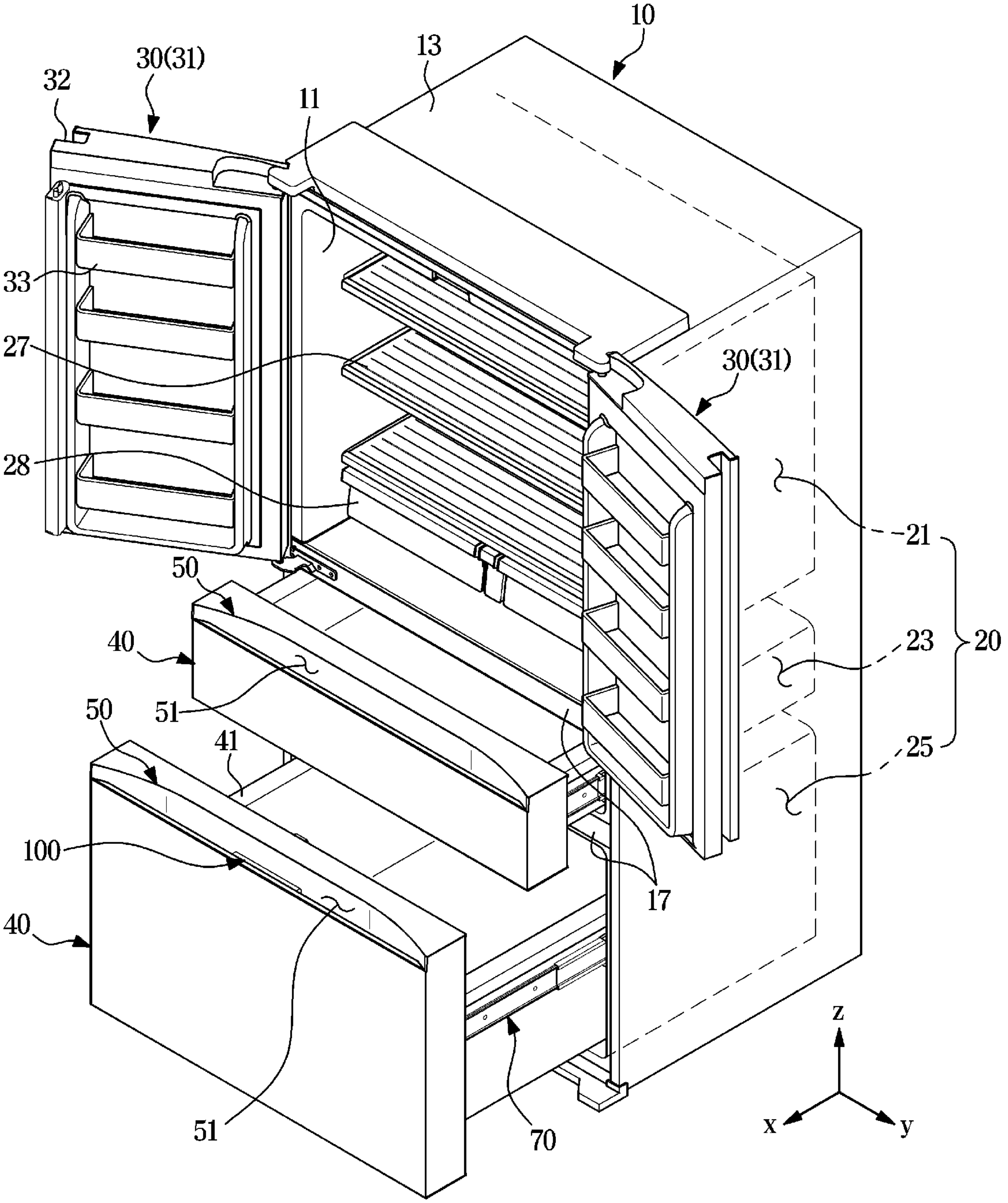
FIG. 1 is a perspective view of a refrigerator according to an embodiment of the disclosure.

Configurations illustrated in the embodiments and the drawings described in the present specification are only the preferred embodiments of the disclosure, and thus it is to be understood that various modified examples, which may replace the embodiments and the drawings described in the present specification, are possible when filing the present application.

Also, like reference numerals or symbols denoted in the drawings of the present specification represent members or components that perform the substantially same functions.

Also, the terms used in the present specification are merely used to describe embodiments, and are not intended to limit and/or restrict the disclosure. An expression used in the singular encompasses the expression of the plural, unless it has a clearly different meaning in the context. In the present specification, it is to be understood that the terms such as "comprising", "including" or "having", etc., are intended to indicate the existence of the features, numbers, steps, operations, components, parts, or combinations thereof disclosed in the specification, and are not intended to preclude the possibility that one or more other features, numbers, steps, operations, components, parts, or combinations thereof may exist or may be added.

Also, it will be understood that, although the terms including ordinal numbers, such as "first", "second", etc., may be used herein to describe various components, these components should not be limited by these terms. These terms are only used to distinguish one component from another. For example, a first component could be termed a second component, and, similarly, a second component could be termed a first component, without departing from the scope of the present disclosure. As used herein, the term "and/or" includes any and all combinations of one or more of associated listed items.

In the following description, the terms "front end", "rear end", "upper portion", "lower portion", "front surface", "rear surface", "upper end", "lower end", etc. are defined based on the drawings, and the shapes and positions of the corresponding components are not limited by the terms.

Throughout the disclosure, the expression "at least one of a, b or c" indicates only a, only b, only c, both a and b, both a and c, both b and c, all of a, b, and c, or variations thereof.

Therefore, it is an aspect of the disclosure to provide a door opening device that is operable within a small space and prevented from being exposed to outside, and a refrigerator having the door opening device.

Additional aspects of the disclosure will be set forth in part in the description which follows and, in part, will be obvious from the description, or may be learned by practice of the disclosure.

Hereinafter, embodiments of the disclosure will be described in detail with reference to the accompanying drawings.

FIG. 1 is a perspective view of a refrigerator according to an embodiment of the disclosure.

As shown in FIG. 1, a refrigerator may include a main body 10, a storage room 20 formed inside the main body 10 and provided as a plurality of rooms of which front sides open, and a door 30 for opening or closing an open front side of the storage room 20.

The main body 10 may include an inner case 11 forming the storage room 20, and an outer case 13 forming an outer appearance. An insulation 15 may be foamed between the inner case 11 and the outer case 13 and inside the door 30 to prevent cool air from leaking out of the storage room 20 (see FIG. 14).

The main body 10 may include a cool air supplier for supplying cool air to the storage room 20. The cool air supplier may include a compressor (not shown), a condenser (not shown), an expansion valve (not shown), an evaporator (not shown), a blower fan (not shown), a cool air duct (not shown), etc.

In a rear, lower portion of the main body 10, a machine room (not shown) in which the compressor for compressing a refrigerant and the condenser for condensing the compressed refrigerant are installed may be provided.

The evaporator for generating cool air, the blower fan for blowing cool air generated by the evaporator to inside of the storage room 20, and the cool air duct for guiding cool air generated by the evaporator to the storage room 20 may be positioned on a rear wall of the storage room 20. A plurality of evaporators, a plurality of blower fans, and a plurality of cool air ducts may be configured to independently supply cool air to the storage room 20.

The storage room 20 may be partitioned into a plurality of storage rooms by a partition wall 17. The storage room 20 may be divided into an upper room 21, a middle room 23, and a lower room 25 in an up-down direction by the partition wall 17. The upper room 21, the middle room 23, and the lower room 25 may keep food refrigerated or frozen as necessary.

In the upper room 21, a plurality of shelves 27 may be provided to partition the upper room 21 into a plurality of spaces. In the upper room 21, a plurality of storage containers 28 for storing food, etc. may be provided.

The door 30 may include a side-by-side type door 31 rotatably coupled with the main body 10 to open or close the upper room 21. The side-by-side type door 31 may include a recess type handle 32 that a user grips to open or close the side-by-side type door 31. On a rear surface of the side-by-side type door 31, a plurality of door guards 33 for accommodating food, etc. may be installed.

The door 30 may include a drawer type door 40 that is slidingly movable with respect to the main body 10 to open or close the middle room 23 and the lower room 25 independently. The drawer type door 40 may include a handle pocket 51 as a recess type handle that a user grips to open or close the drawer type door 40. The drawer type door 40 may include a storage box for storing food, etc. therein.

The middle room 23 and the lower room 25, which are opened or closed by the drawer type door 40, may have different capacities. In the drawings, the lower room 25 is shown to have a larger capacity than the middle room 23, although not limited thereto. In the drawer type door 40 for opening or closing the lower room 25 having the larger capacity among drawer type doors 40 for opening or closing the middle room 23 and the lower room 25, a door opening device 100 for opening the drawer type door 40 may be provided. The reason may be because greater strength is required to open the drawer type door 40 for opening or closing the lower room 25 having the larger capacity than that required to open the drawer type door 40 for opening or closing the middle room 23 having a smaller capacity. In the drawing, the door opening device 100 is shown to be provided only in the drawer type door 40 for opening or closing the lower room 25, although not limited thereto. That is, the door opening device 100 may be also provided in the drawer type door 40 for opening or closing the middle room 23. A configuration of the drawer type door 40 equipped with the door opening device 100 will be described below.

The drawer type doors 40 may be slidingly inserted into or taken out of the middle room 23 and the lower room 25 by a sliding device 70. One sides of the sliding device 70 for slidingly moving the drawer type doors 40 may be respectively coupled with both inner side walls of the middle room 23 and the lower room 25 in which the drawer type doors 40 are respectively accommodated, and the other sides of the sliding device 70 may be respectively coupled with both side surfaces of the drawer type doors 40.

Figure 2:
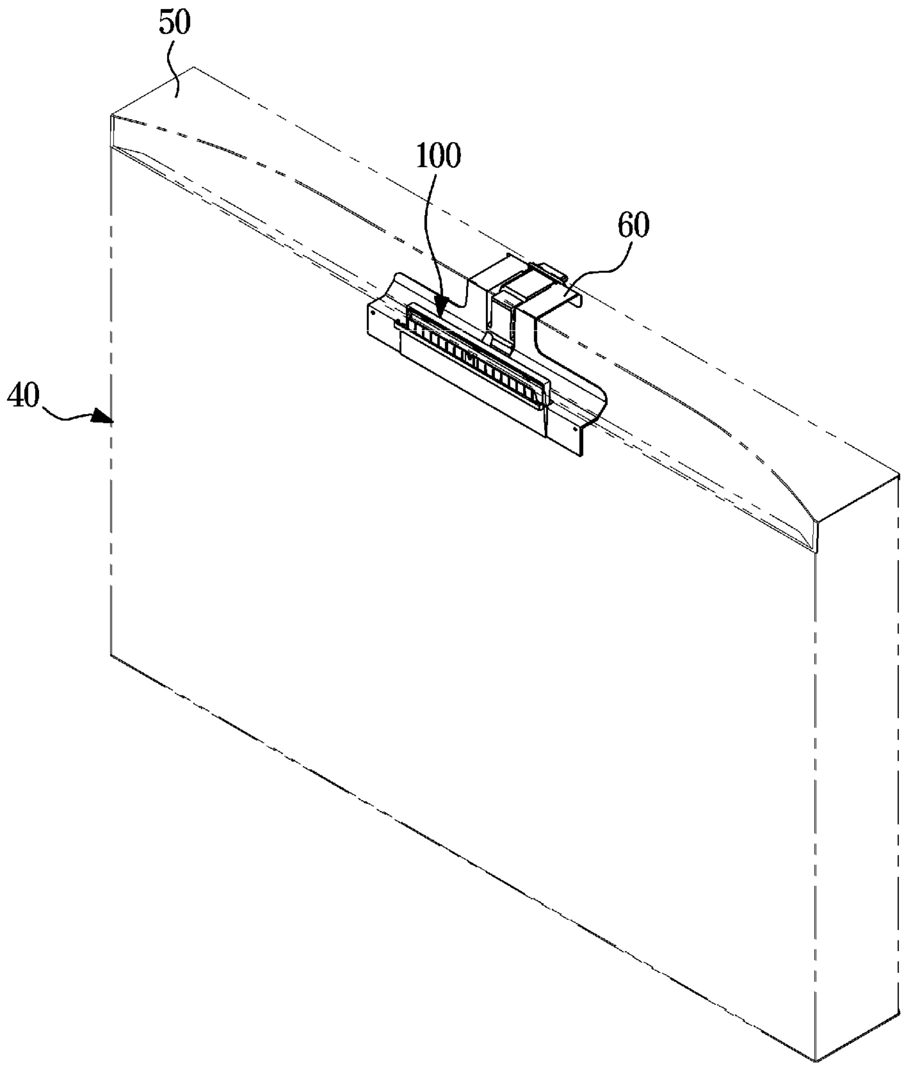
FIG. 2 shows a door opening device installed in a drawer type door according to an embodiment of the disclosure.
Figure 3:
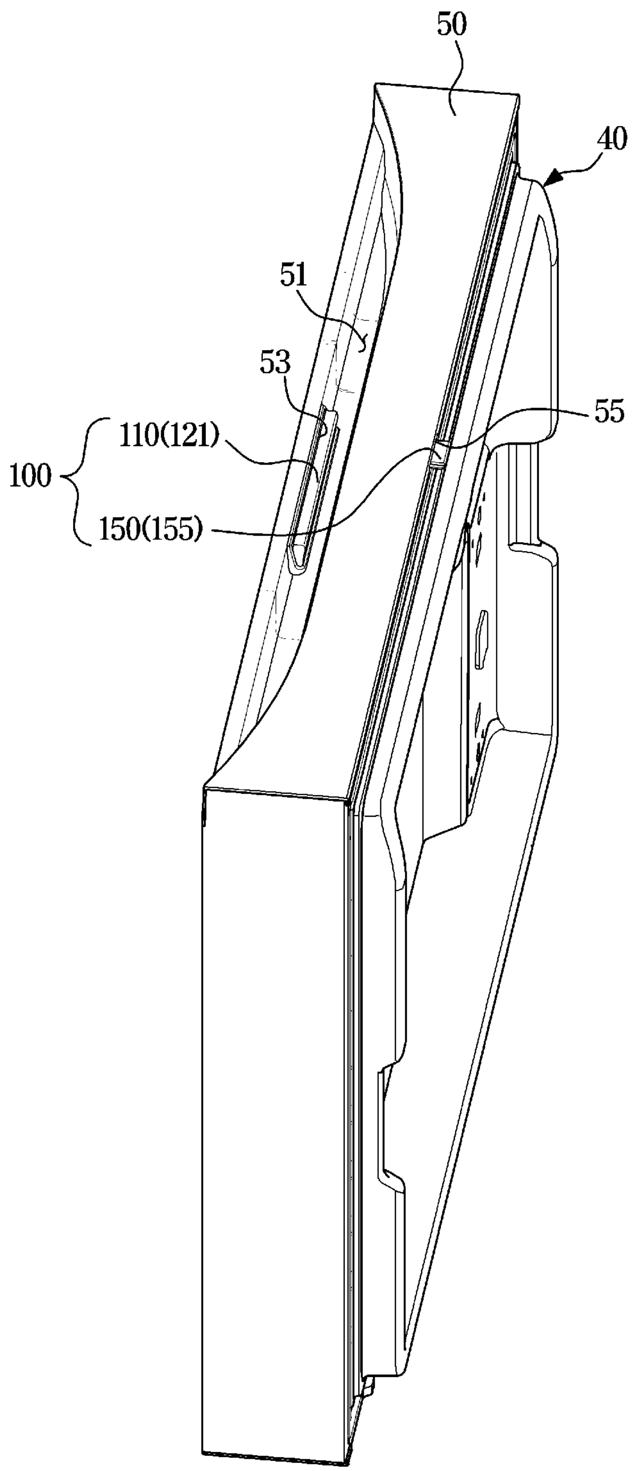
FIG. 3 is a top view of a drawer type door according to an embodiment of the disclosure.
Figure 4:
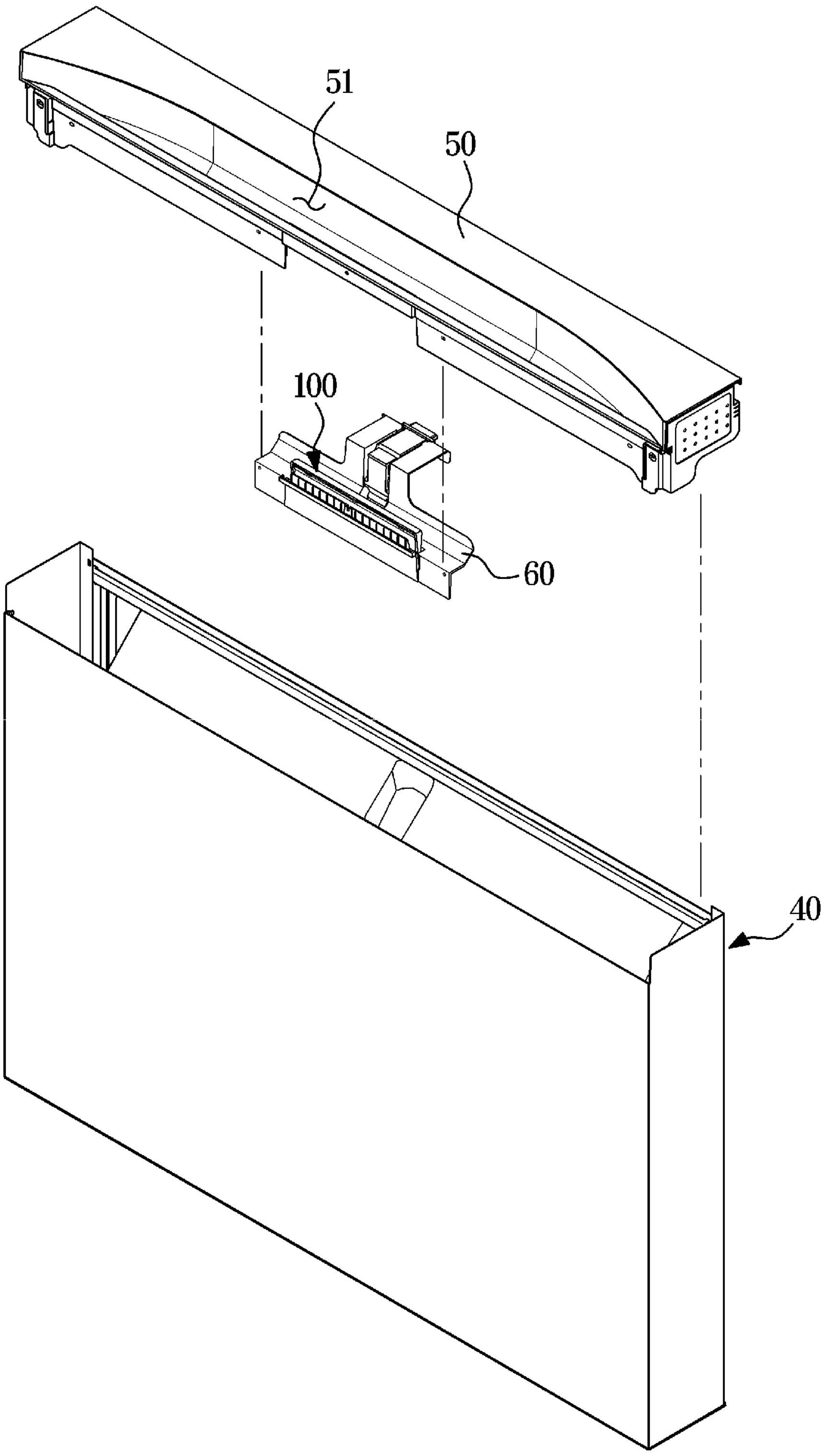
FIG. 4 shows a state in which a door cap is assembled with an upper portion of a drawer type door according to an embodiment of the disclosure, and a door opening device is assembled with a lower portion of the door cap.

FIG. 2 shows a door opening device installed in a drawer type door according to an embodiment of the disclosure. FIG. 3 is a top view of a drawer type door according to an embodiment of the disclosure. FIG. 4 shows a state in which a door cap is assembled with an upper portion of a drawer type door according to an embodiment of the disclosure, and a door opening device is assembled with a lower portion of the door cap.

As shown in FIGS. 2 to 4, the door opening device 100 may be provided in the drawer type door 40. The drawer type door 40 may include a door cap 50 assembled with an upper portion of the drawer type door 40. The door cap 50 may include a handle pocket 51 which is a recess type handle. The handle pocket 51 may be formed in a shape of a downward depressed groove to enable a user to grip to open the drawer type door 40. The door opening device 100 may be assembled with a lower portion of the door cap 50. The door opening device 100 may be assembled with the lower portion of the handle pocket 51 to be prevented from being exposed to outside. Because the door opening device 100 is prevented from being exposed to the outside, the drawer type door 40 that opens or closes the lower room 25 may have the same outer appearance as the drawer type door 40 that opens or closes the middle room 23 and does not include the door opening device 100, as seen from in front of the refrigerator. Therefore, the drawer type door 40 for opening or closing the middle room 23 and the drawer type door 40 for opening or closing the lower room 25 may give a sense of unity, which leads to an improvement of the outer appearance (see FIG. 1).

The door cap 50 may include a first opening 53 for exposing a portion of a handle lever 110 which will be described below to the hand pocket 51. The first opening 53 may be formed in a front portion of walls forming the handle pocket 51. A user may grip the handle pocket 51 and press the portion of the handle lever 110 exposed through the first opening 53. The portion of the handle lever 110 exposed through the first opening 53 may be a grip portion 121.

The door cap 50 may include a second opening 55 formed at a location corresponding to an opening 63*b* of a door bracket 60 which will be described below. A portion of a slider 150 which will be described below may be exposed to outside of the drawer type door 40 through the second opening 55. The slider 150 exposed to the outside of the drawer type door 40 through the second opening 55 may move toward a rear direction, that is, toward the main body 10 by the handle lever 110 to press the main body 10. The second opening 55 will be described in detail together with the door bracket 60, below.

The door opening device 100 may be assembled with the door bracket 60. The door bracket 60 may be assembled with a center portion of a lower end of the door cap 50. That is, the door opening device 100 may be assembled with the door bracket 60 and then assembled with the center portion of the lower end of the door cap 50. The door opening device 100 may be assembled with the lower end of the door cap 50 to be prevented from being exposed to the outside. The door opening device 100 may be positioned such that only the grip portion 121 being a portion of the handle lever 110 is exposed to the outside through the first opening 53 and the remaining portion of the door opening device 100 is prevented from being exposed to the outside.

Figure 5:
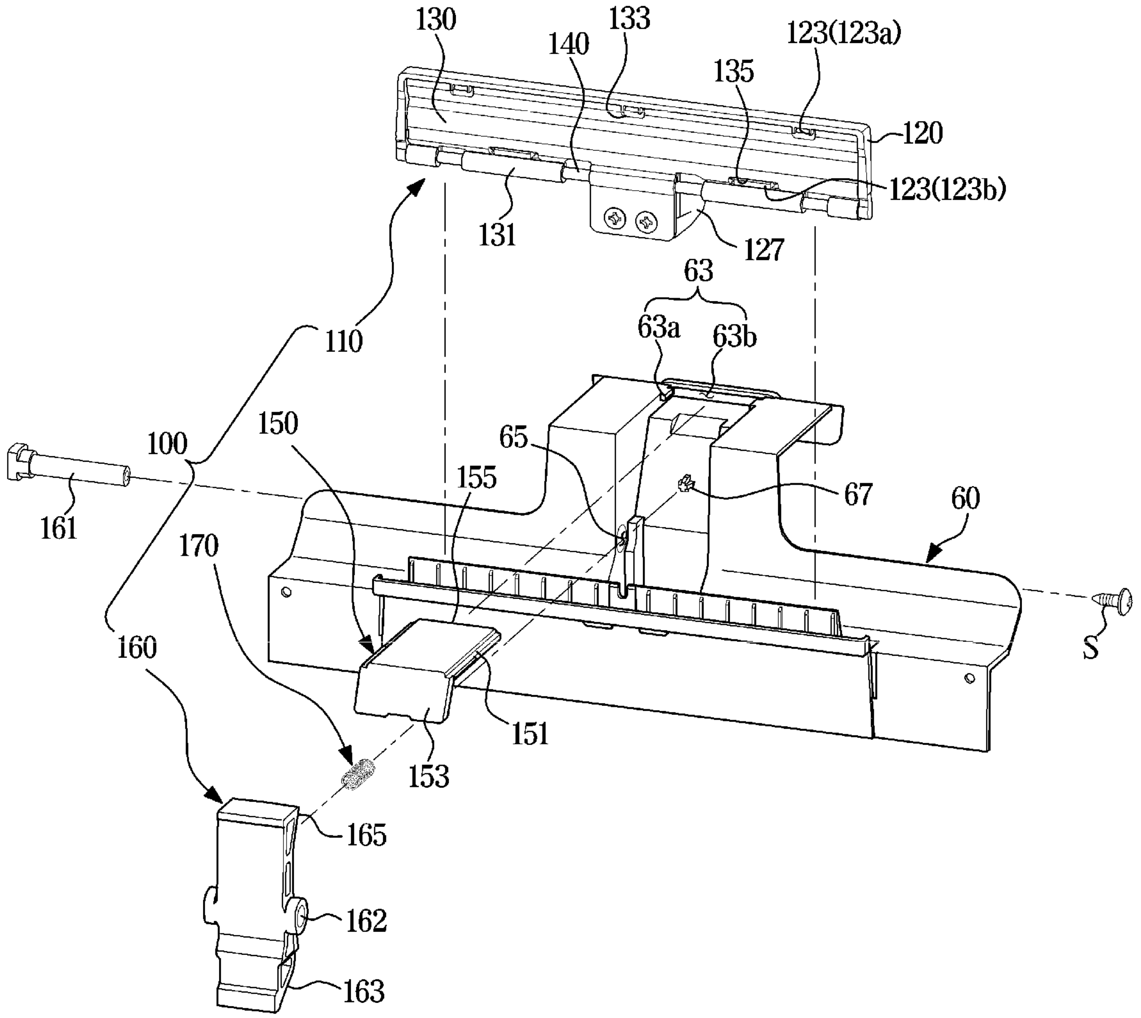
FIG. 5 shows a state in which a door opening device according to an embodiment of the disclosure is assembled with a door bracket.
Figure 6:
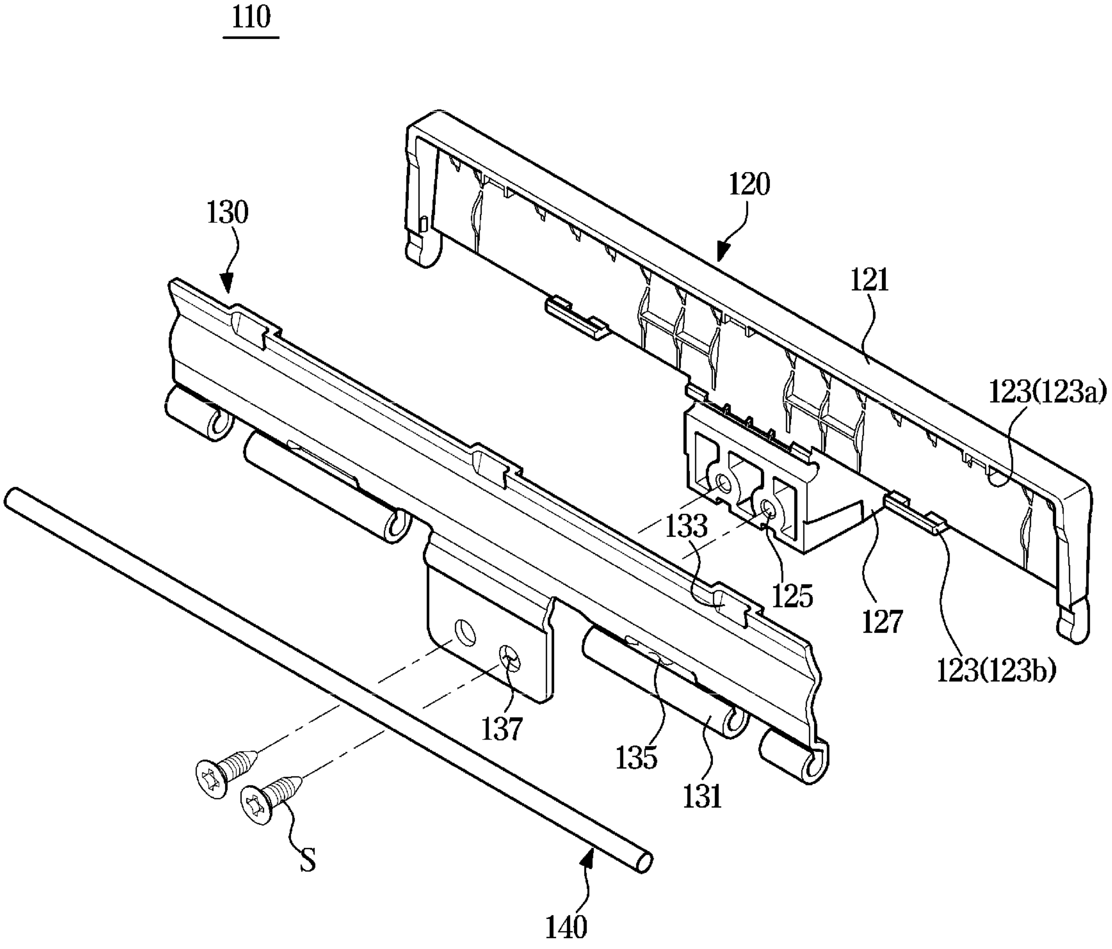
FIG. 6 is an exploded perspective view of a handle lever according to an embodiment of the disclosure.

FIG. 5 shows a state in which a door opening device according to an embodiment of the disclosure is assembled with a door bracket. FIG. 6 is an exploded perspective view of a handle lever according to an embodiment of the disclosure.

As shown in FIGS. 5 and 6, the door opening device 100 may be assembled with the door bracket 60. The door opening device 100 may include the handle lever 110 rotatably assembled with the door bracket 60. The handle lever 110 may rotate by being gripped and pressed by a user. The handle lever 110 may rotate to rotate a transfer lever 160 which will be described below.

The door bracket 60 may include a handle lever assembling portion 61 with which the handle lever 110 is assembled. The handle lever 110 may be rotatably assembled with the handle lever assembling portion 61 of the door bracket 60. The handle lever assembling portion 61 may be formed in a depressed shape in which a portion of the handle lever 110 is accommodated. The handle lever assembling portion 61 may include a plurality of fixing hooks 61*a* to which a handle lever rotation shaft 140 is rotatably fixed (see FIG. 10).

The door bracket 60 may include a slider assembling portion 63 with which the slider 150 is assembled. The slider 150 may be assembled with the slider assembling portion 63 of the door bracket 60 in such a way as to be linearly movable with respect to the slider assembling portion 63. The slider assembling portion 63 may include a guide protrusion 63*a* guiding the slider 150 to linearly move. The slider assembling portion 63 may include the opening 63*b* to enable the slider 150 to linearly move toward the rear direction and thus press the main body 10 (see FIG. 1).

The door bracket 60 may include a transfer lever assembling hole 65 with which the transfer lever 160 is assembled. A transfer lever rotation shaft 161 of the transfer lever 160 may be fixed to the transfer lever assembling hole 65. The transfer lever 160 may be rotatably fixed to the transfer lever rotation shaft 161.

The handle lever 110 may include a bracket 120. The bracket 120 may include the grip portion 121 exposed to the handle pocket 51 through the first opening 53 formed in the door cap 50. The grip portion 121 may be exposed to the outside through the handle pocket 51 such that a user presses the grip portion 121 while gripping the handle pocket 51. As a result of pressing of the grip portion 121 by the user, the handle lever 110 may rotate (see FIG. 3).

The bracket 120 may include a plurality of catching hooks 123 with which a reinforcing member 130 is assembled. The plurality of catching hooks 123 may include a plurality of first catching hooks 123*a* and a plurality of second catching hooks 123*b*. The plurality of first catching hooks 123*a* may be formed in an upper portion of the bracket 120. The plurality of second catching hooks 123*b* may be formed in a lower portion of the bracket 120. The plurality of first catching hooks 123*a* may be caught by a plurality of catching grooves of the reinforcing member 130 which will be described below and fixed. The plurality of second catching hooks 123*b* may be caught by a plurality of catching holes 135 of the reinforcing member 130 and fixed.

The bracket 120 may include a first coupling hole 125 through which the reinforcing member 130 is coupled with the bracket 120 by a coupling member S after the reinforcing member 130 is assembled with the bracket 120. The first coupling hole 125 may be formed at a location corresponding to a second coupling hole 137 formed in the reinforcing member 130. By coupling the coupling member S with the second coupling hole 137 of the reinforcing member 130 and the first coupling hole 125 of the bracket 120, the reinforcing member 130 may be coupled with the bracket 120.

The bracket 120 may include a rotating and pressing portion 127 pressing the transfer lever 160. The rotating and pressing portion 127 may be in contact with a sliding surface 163 of the transfer lever 160 which will be described below. One end of the rotating and pressing portion 127, which is in contact with the sliding surface 163, may be in a shape of a cylinder. The end of the rotating and pressing portion 127, which is in a shape of a cylinder, may be in linear contact with the sliding surface 163. According to a rotation of the handle lever 110, the rotating and pressing portion 127 may slidingly move along the sliding surface 163 to rotate the transfer lever 160 (see FIG. 15).

The handle lever 110 may include the reinforcing member 130. The reinforcing member 130 may be coupled with the bracket 120 to reinforce stiffness of the bracket 120. The reinforcing member 130 may include a fixing portion 131 to which the handle lever rotation shaft 140 is fixed. The handle lever rotation shaft 140 may be inserted into and fixed to the fixing portion 131.

The reinforcing member 130 may include a plurality of catching grooves 133 and a plurality of catching holes 135 with which the plurality of catching hooks 123 of the bracket 120 are assembled. The plurality of first catching hooks 123*a* among the plurality of catching hooks 123 may be assembled with the plurality of catching grooves 133 by being caught by the plurality of catching grooves 133. The plurality of second catching hooks 123*b* among the plurality of catching hooks 123 may be assembled with the plurality of catching holes 135 by being caught by the plurality of catching holes 135.

The reinforcing member 130 may include a second coupling hole 137 to enable the reinforcing member 130 to be coupled with the bracket 120 by a coupling member S. The second coupling hole 137 may be formed at a location corresponding to the first coupling hole 125 formed in the bracket 120. The coupling member S may be coupled with the second coupling hole 137 of the reinforcing member 130 and the first coupling hole 125 of the bracket 120 to couple the reinforcing member 130 with the bracket 120.

The handle lever 110 may include the handle lever rotation shaft 140. The handle lever rotation shaft 140 may be inserted into and fixed to the fixing portion 131 of the reinforcing member 130. The handle lever rotation shaft 140 may be rotatably fixed to a fixing hook 61*a* (which will be described below) of the door bracket 60. The handle lever 110 may be rotatably assembled with the door bracket 60 by the handle lever rotation shaft 140. The handle lever 110 may rotate on the handle lever rotation shaft 140.

The door opening device 100 may include the slider 150 assembled with the door bracket 60 in such a way to be linearly movable with respect to the door bracket 60. As a result of pressing and rotating of the handle lever 110 by a user, the transfer lever 160 may rotate by the handle lever 110, and the slider 150 may linearly move by the rotating transfer lever 160 to press the main body 10. According to pressing of the main body 10 by the slider 150, the drawer type door 40 may open (see FIG. 1).

The slider 150 may include a guide rail 151 that is guided by the guide protrusion 63*a* of the door bracket 60. A pair of guide rails 151 may be respectively formed at both side surfaces of the slider 151. The guide rail 151 may be guided by the guide protrusion 63*a*, and thus, the slider 150 may move linearly.

The slider 150 may include a pushed portion 153 that is pushed by the transfer lever 160. The pushed portion 153 may be provided in a rear end of the slider 150 to be in contact with the transfer lever 160. According to a rotation of the transfer lever 160 by the handle lever 110, the transfer lever 160 may push the pushed portion 153 to cause the slider 150 to linearly move toward the rear direction. That is, the slider 150 may move linearly toward the main body 10 (see FIG. 1).

The slider 150 may include a pressing portion 155 that moves linearly toward the rear direction to press the main body 10 (see FIG. 1). The pressing portion 155 may be provided at a front end of the slider 150. According to pushing of the pushed portion 153 by the transfer lever 160, the slider 150 may move linearly toward the rear direction, and thus, the pressing portion 155 may press the main body 10 (see FIG. 1) through the opening 63*b* formed in the door bracket 60. The opening 63*b* may be formed at a location corresponding to the second opening 55 of the door cap 50. Accordingly, the pressing portion 155 may press the main body 10 (see FIG. 1) through the opening 63*b* of the door bracket 60 and the second opening 55 of the door cap 50.

The door opening device 100 may include the transfer lever 160 assembled with the door bracket 60 and rotating with respect to the door bracket 60. The transfer lever 160 may be positioned between the handle lever 110 and the slider 150. According to a rotation of the handle lever 110, the transfer lever 160 may rotate by the handle lever 110, and according to the rotation of the transfer lever 160, the slider 150 may move linearly by the transfer lever 160 to press the main body 10 (see FIG. 1).

The transfer lever 160 may include the transfer lever rotation shaft 161 assembled with the transfer lever assembling hole 65 of the door bracket 60. After the transfer lever rotation shaft 161 is assembled with the transfer lever assembling hole 65, the transfer lever rotation shaft 161 may be fixed by the coupling member S. The transfer lever 160 may be rotatably fixed to the transfer lever rotation shaft 161.

The transfer lever 160 may include a rotation hole 162 rotatably fixed to the transfer lever rotation shaft 161. The transfer lever rotation hole 161 may be rotatably fixed to the transfer lever rotation shaft 161, and thus, the transfer lever 160 may rotate on the transfer lever rotation shaft 161.

The transfer lever 160 may include the sliding surface 163 inclined such that the rotating and pressing portion 127 of the handle lever 110 slidingly moves on the sliding surface 163. The sliding surface 163 may be a contact surface being in contact with the rotation and pressing portion 127 of the handle lever 110. According to a rotation of the handle lever

110, the rotating and pressing portion 127 may slidingly move along the sliding surface 163 to rotate the transfer lever 160. The end of the rotating and pressing portion 127 may be in a shape of a cylinder to be in linear contact with the sliding surface 163. Because the end of the rotating and pressing portion 127 is in linear contact with the sliding surface 163 and the rotating and pressing portion 127 slidingly moves along the inclined sliding surface 163 according to a rotation of the handle lever 110 to rotate the transfer lever 160, an angle by which the transfer lever 160 rotates may be greater than an angle by which the handle lever 110 rotates. Accordingly, although the handle lever 110 rotates by a small angle, the slider 150 may move to a long distance by the transfer lever 160 rotating by a great angle (see FIG. 15).

The transfer lever 160 may include a push portion 165 that is in contact with the slider 150 to push the slider 150. According to a rotation of the transfer lever 160 by the handle lever 110, the push portion 165 may push the pushed portion 153 of the slider 150 to cause the slider 150 to linearly move toward the main body 10 (see FIG. 1).

The transfer lever 160 may include a first support protrusion 167 (see FIG. 15) supporting one end of an elastic member 170. The transfer lever 160 may compress the elastic member 170 according to a rotation of the first support protrusion 167 (see FIG. 15) in a direction toward the second support protrusion 67 of the door bracket 60, and by a compressive force of the elastic member 170, the first support protrusion 167 (see FIG. 15) may rotate in an opposite direction of the direction toward the second support protrusion 67 of the door bracket 60.

The door opening device 100 may include the elastic member 170 of which one end is supported on the transfer lever 160 and the other end is supported on the door bracket 60. The elastic member 170 may be a spring. The transfer lever 160 may include a first support protrusion 167 (see FIG. 15) supporting the one end of the elastic member 170. The door bracket 60 may include a second support protrusion 67 supporting the other end of the elastic member 170. The elastic member 170 may be positioned between the transfer lever 160 and the door bracket 60. As a result of pressing and rotating of the handle lever 110 by a user, the transfer lever 160 may rotate by the handle lever 110 to compress the elastic member 170. Upon removal of a force applied to the handle lever 110 in the compressed state of the elastic member 170, the transfer lever 160 may rotate in an opposite direction of a direction in which the force has been applied to the handle lever 110 by the compressive force of the elastic member 170. According to the rotation of the transfer lever 160, the handle lever 110 may rotate by the transfer lever 160 to return to an original position before the force is applied to the handle lever 110.

Figure 7:
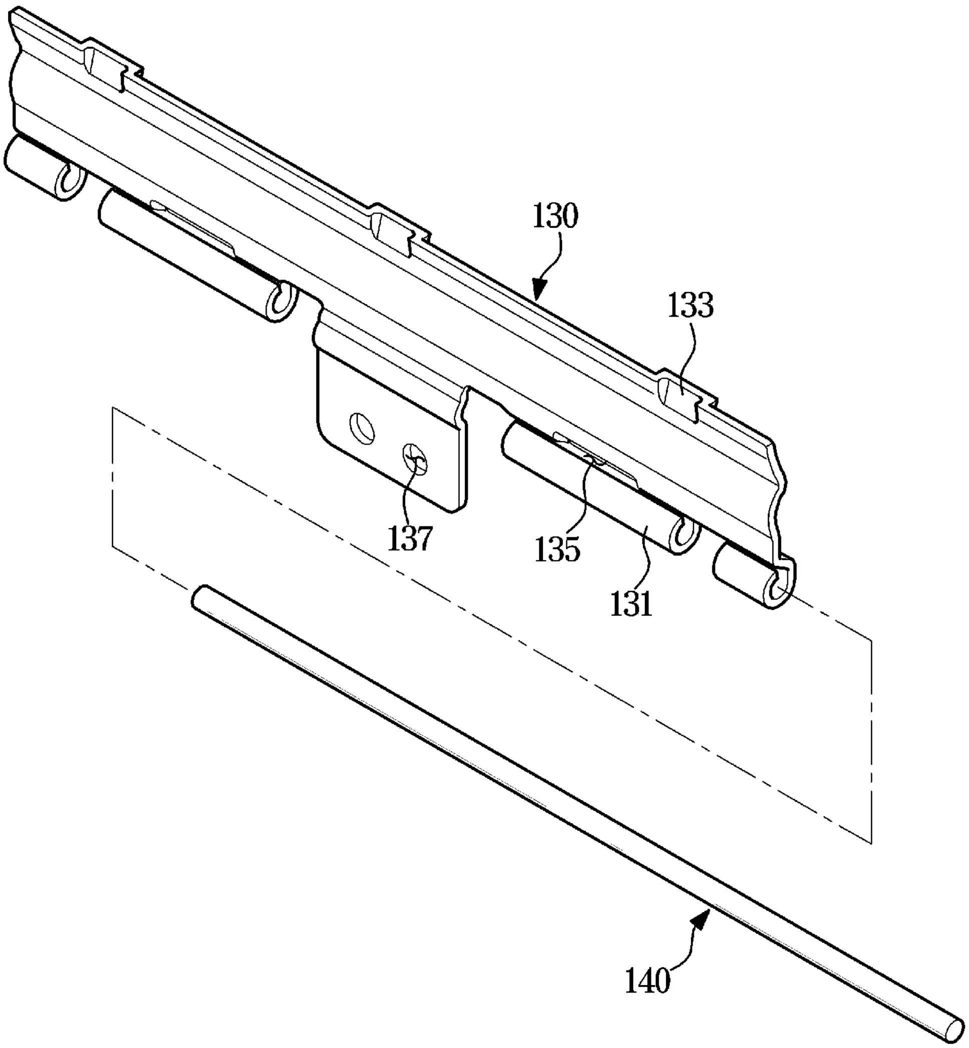
FIG. 7 shows a state in which a handle lever rotation shaft according to an embodiment of the disclosure is fixed to a reinforcing member.
Figure 8:
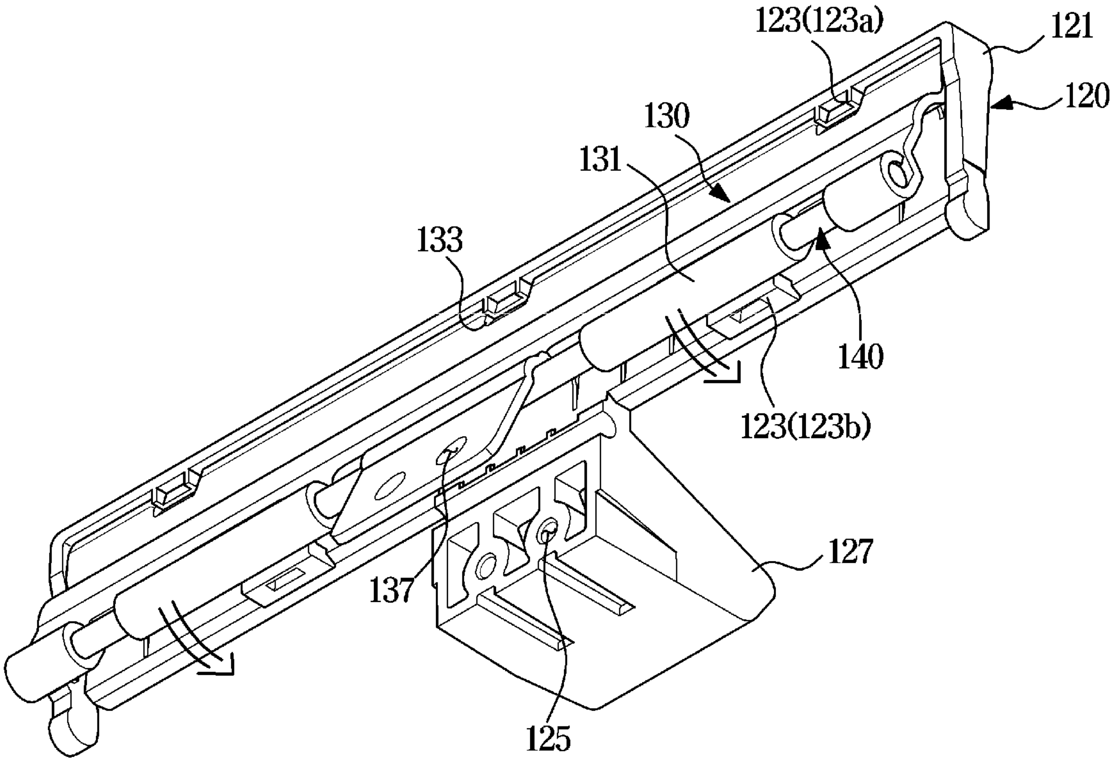
FIG. 8 shows a state in which a reinforcing member according to an embodiment of the disclosure is assembled with a bracket.
Figure 9:
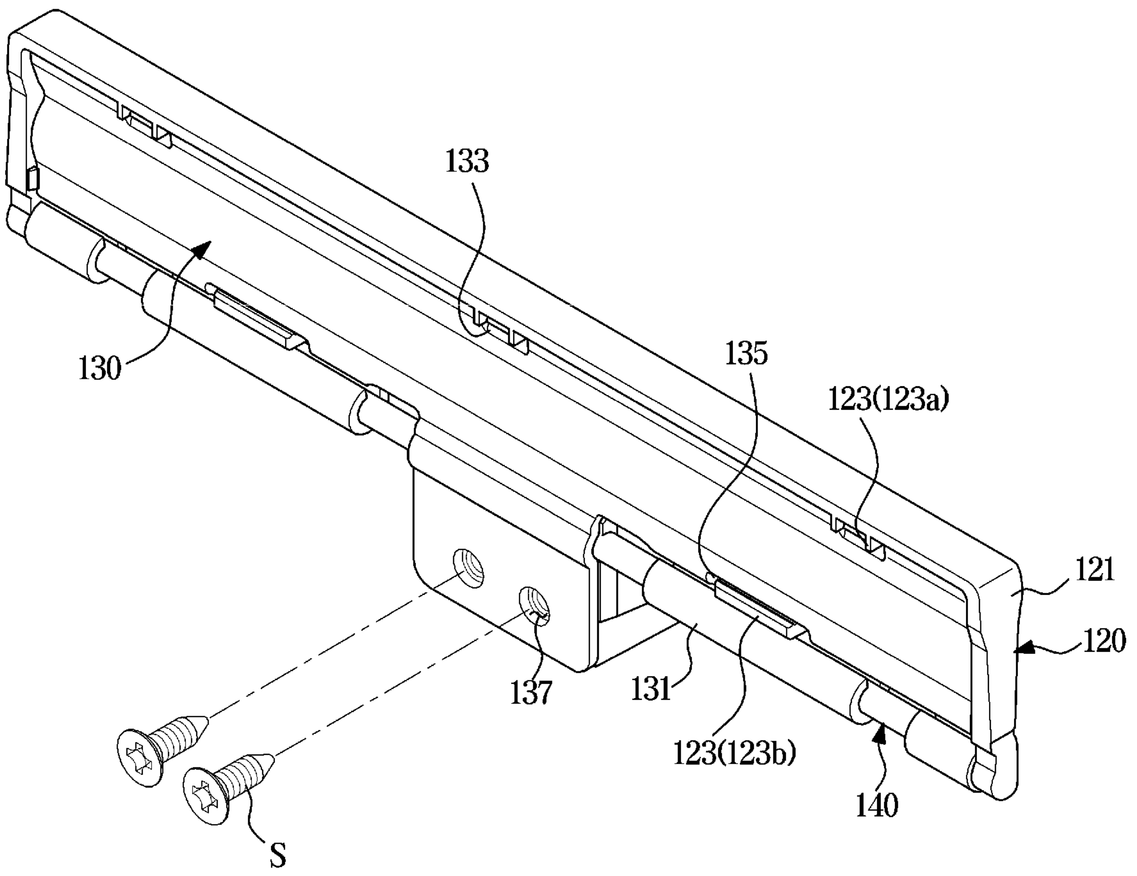
FIG. 9 shows a state in which a reinforcing member according to an embodiment of the disclosure is assembled with a bracket and then coupled with the bracket by a coupling member.

FIG. 7 shows a state in which a handle lever rotation shaft according to an embodiment of the disclosure is fixed to a reinforcing member. FIG. 8 shows a state in which a reinforcing member according to an embodiment of the disclosure is assembled with a bracket. FIG. 9 shows a state in which a reinforcing member according to an embodiment of the disclosure is assembled with a bracket and then coupled with the bracket by a coupling member.

As shown in FIG. 7, the handle lever rotation shaft 140 may be inserted into and fixed to the fixing portion 131 of the reinforcing member 130.

After the handle lever rotation shaft 140 is fixed to the fixing portion 131 of the reinforcing member 130, the reinforcing member 130 may be assembled with the bracket 120, as shown in FIG. 8. To assemble the reinforcing member 130 with the bracket 120, the plurality of first catching hooks 123*a* among the plurality of catching hooks 123 formed in the bracket 120 may be inserted into and fixed to the plurality of catching grooves 133 of the reinforcing member 130. The plurality of first catching hooks 123*a* of the bracket 120 may be formed in the upper portion of the bracket 120 and the plurality of catching grooves 133 of the reinforcing member 130 may be formed in an upper portion of the reinforcing member 130. After the plurality of first catching hooks 123*a* are fixed to the plurality of catching grooves 133, the reinforcing member 130 may rotate.

By rotating the reinforcing member 130, the plurality of second catching hooks 123*b* of the bracket 120 may be fixed to the plurality of catching holes 135 of the reinforcing member 130, as shown in FIG. 9. According to the fixing of the plurality of catching hooks 123*b* of the bracket 120 to the plurality of catching holes 135 of the reinforcing member 130, the first coupling hole 125 of the bracket 120 may be aligned with the second coupling hole 137 of the reinforcing member 130. After the plurality of second catching hooks 123*b* of the bracket 120 are fixed to the plurality of catching holes 135 of the reinforcing member 130, a coupling member S may be coupled with the second coupling hole 137 and the first coupling hole 125, thereby assembling the reinforcing member 130 with the bracket 120.

Figure 10:
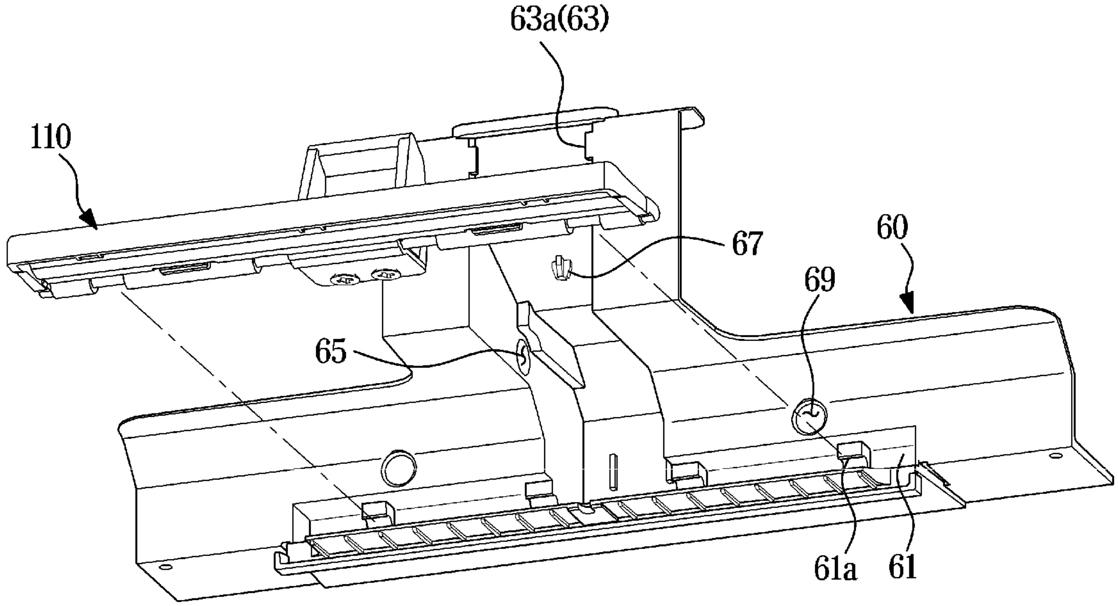
FIG. 10 shows a state in which a handle lever according to an embodiment of the disclosure is assembled with a door bracket.
Figure 11:
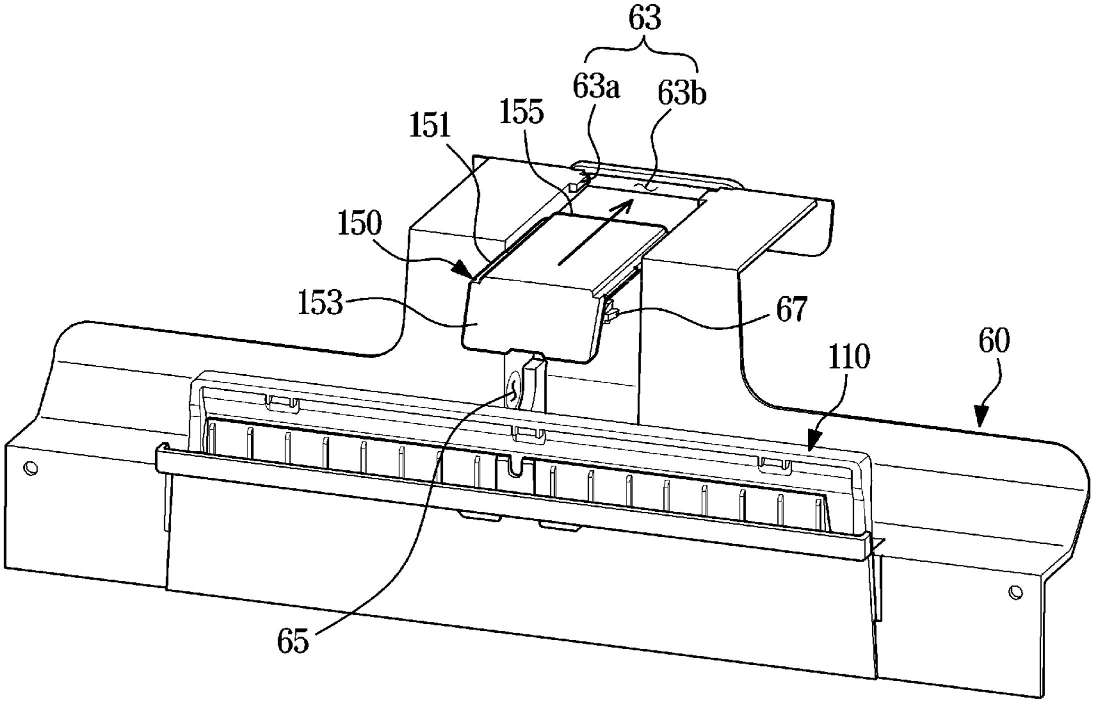
FIG. 11 shows a state in which a slider according to an embodiment of the disclosure is assembled with a door bracket.
Figure 12:
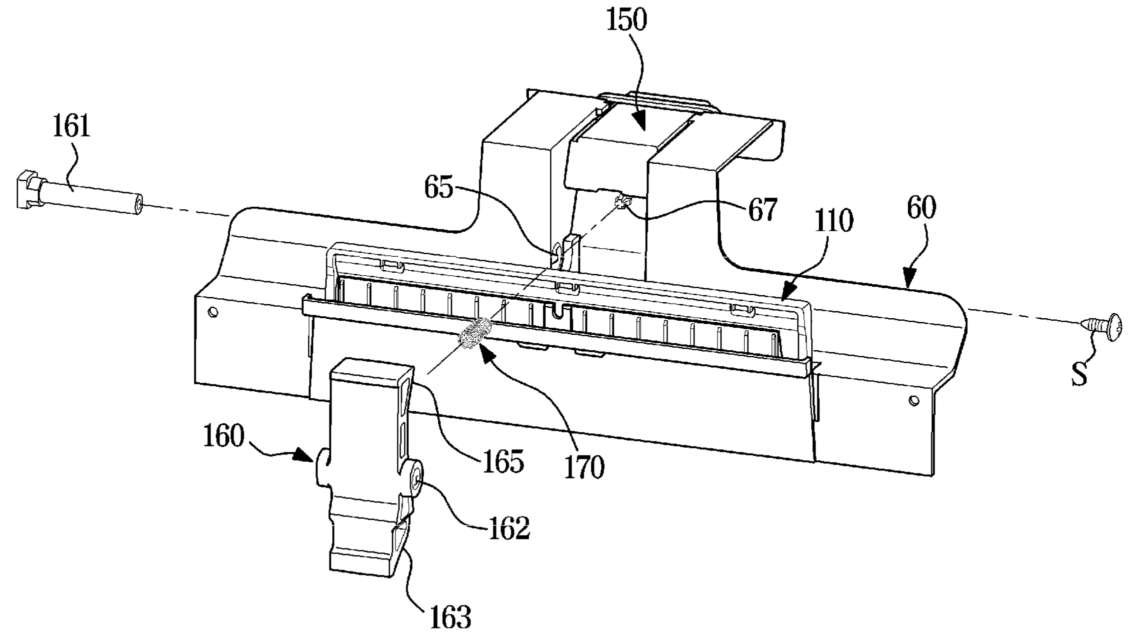
FIG. 12 shows a state in which a transfer lever and an elastic member according to an embodiment of the disclosure are assembled with a door bracket.

FIG. 10 shows a state in which a handle lever according to an embodiment of the disclosure is assembled with a door bracket. FIG. 11 shows a state in which a slider according to an embodiment of the disclosure is assembled with a door bracket. FIG. 12 shows a state in which a transfer lever and an elastic member according to an embodiment of the disclosure are assembled with a door bracket.

As shown in FIG. 10, the handle lever 110 may be assembled with the door bracket 60. The handle lever 110 may be rotatably assembled with the handle lever assembling portion 61 of the door bracket 60. The handle lever rotation shaft 140 may be rotatably fixed to the plurality of fixing hooks 61*a* of the handle lever assembling portion 61.

After the handle lever 110 is assembled with the door bracket 60, the slider 150 may be assembled with the door bracket 60, as shown in FIG. 11. The slider 150 may be assembled with the slider assembling portion 63 of the door bracket 60 in such a way as to be linearly movable with respect to the slider assembling portion 63. The slider 150 may be assembled such that the guide rail 151 is guided by the guide protrusion 63*a* of the door bracket 60 to linearly move.

After the slider 150 is assembled with the door bracket 60, as shown in FIG. 12, one end of the elastic member 170 may be supported on the first support protrusion 167 (see FIG. 15) of the transfer lever 160, and the other end of the elastic member 170 may be supported on the second support protrusion 67 of the door bracket 60. Because both ends of the elastic member 170 are supported on the transfer lever 160 and the door bracket 60, the transfer lever 160 may be positioned such that the rotation hole 162 of the transfer lever 160 is positioned in the transfer lever assembling hole 65 of the door bracket 60. After the transfer lever 160 is positioned such that the rotation hole 162 is positioned in the transfer lever assembling hole 65, the transfer lever rotation shaft 161 may be inserted into the transfer lever assembling hole 65 and the rotation hole 162. After the transfer lever rotation shaft 161 is inserted into the transfer lever assembling hole 65 and the rotation hole 162, the transfer lever rotation shaft 161 may be fixed to the transfer lever assembling hole 65 by a coupling member S. After the transfer lever rotation shaft 161 is fixed to the transfer lever assembling hole 65, the transfer lever 160 may rotate on the transfer lever rotation shaft 161.

Figure 13:
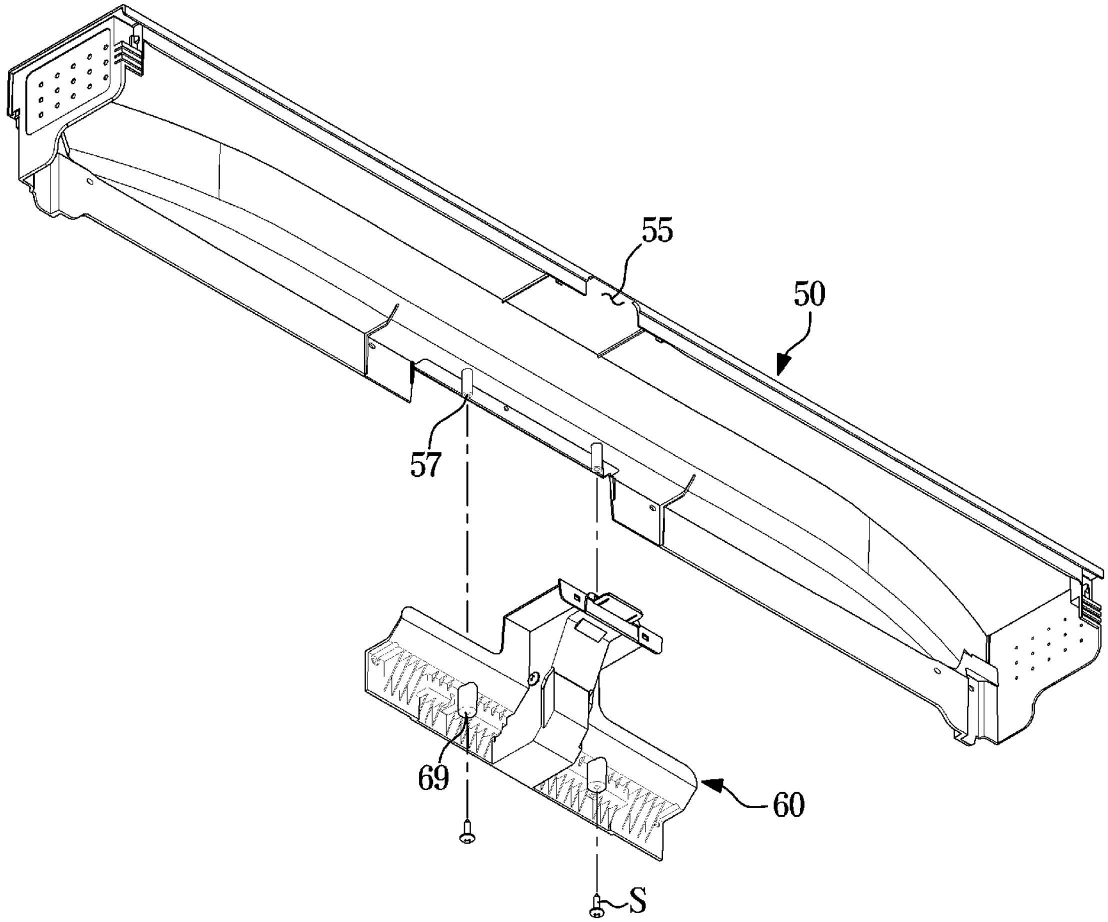
FIG. 13 shows a state in which a door bracket assembled with a door opening device according to an embodiment of the disclosure is assembled with a lower end of a door cap.

FIG. 13 shows a state in which a door bracket assembled with a door opening device according to an embodiment of the disclosure is assembled with a lower end of a door cap.

As shown in FIG. 13, the door bracket 60 assembled with the door opening device 100 may be assembled with the lower end of the door cap 50. The door bracket 60 may be assembled with the center portion of the lower end of the door cap 50. The door bracket 60 may be assembled with a lower end of the handle pocket 51 of the door cap 50. Because the door bracket 60 is assembled with the lower end of the handle pocket 51, the door opening device 100 may be prevented from being exposed to the outside. Because the door opening device 100 is prevented from being exposed, the drawer type door 40 that opens or closes the lower room 25 may have the same outer appearance as the drawer type door 40 that opens or closes the middle room 23 and does not include the door opening device 100, as seen from in front of the refrigerator. Therefore, the drawer type door 40 for opening or closing the middle room 23 and the drawer type door 40 for opening or closing the lower room 25 may give a sense of unity, which leads to an improvement of the outer appearance (see FIG. 1).

In the door bracket 60, a first assembling hole 69 may be formed to assemble the door bracket 60 with the door cap 50. In the door cap 50, a second assembling hole 57 with which the first assembling hole 69 of the door bracket 60 is assembled may be formed. The door bracket 60 may be assembled with the door cap 50 by a coupling member S that is coupled with the first assembling hole 69 and the second assembling hole 57.

Figure 14:
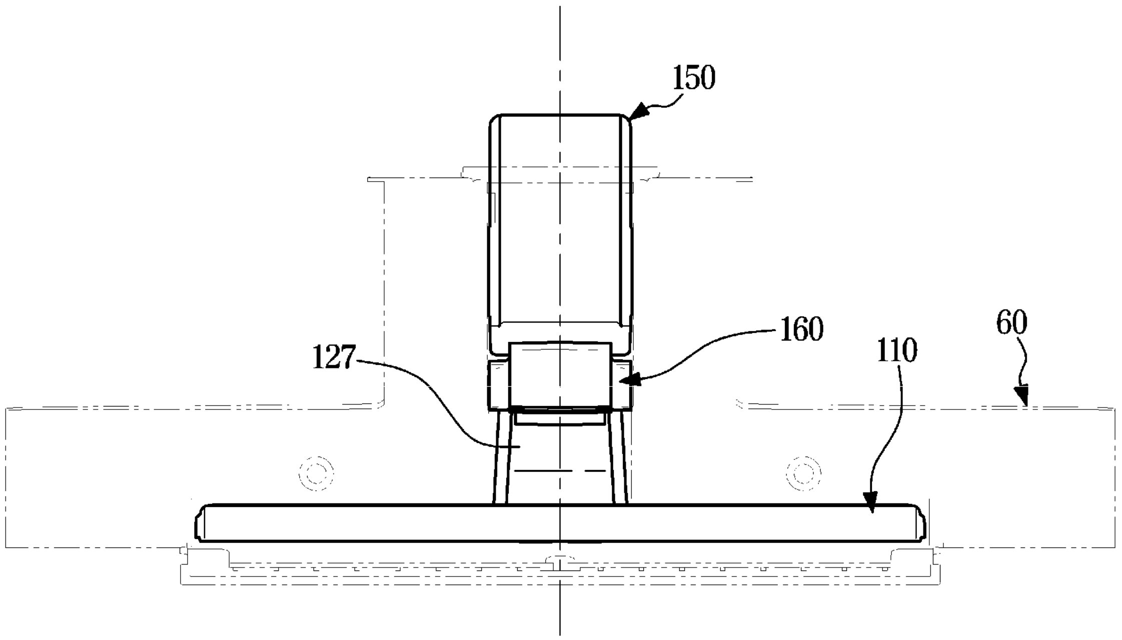
FIG. 14 shows a state in which centers of a handle lever, a transfer lever, and a slider, according to an embodiment of the disclosure, are aligned on the same line.

FIG. 14 shows a state in which centers of a handle lever, a transfer lever, and a slider, according to an embodiment of the disclosure, are aligned on the same line.

As shown in FIG. 14, centers of the handle lever 110, the transfer lever 160, and the slider 150 may be aligned on the same line. Because the centers of the handle lever 110, the transfer lever 160, and the slider 150 are aligned on a straight line, a moving distance of the slider 150 may be prevented from being reduced by bending of the handle lever 110.

Figure 15:
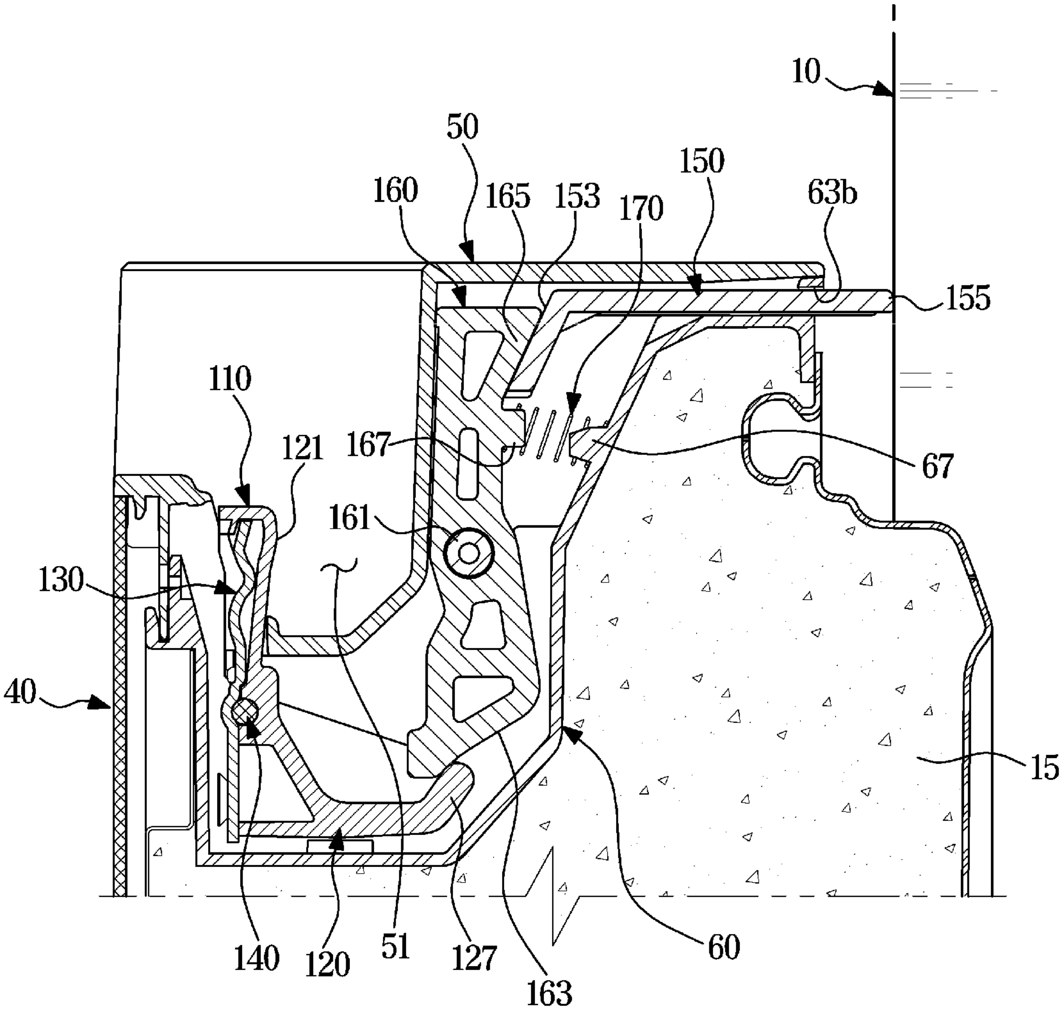
FIG. 15 shows a closed state of a drawer type door assembled with a door opening device according to an embodiment of the disclosure.
Figure 16:
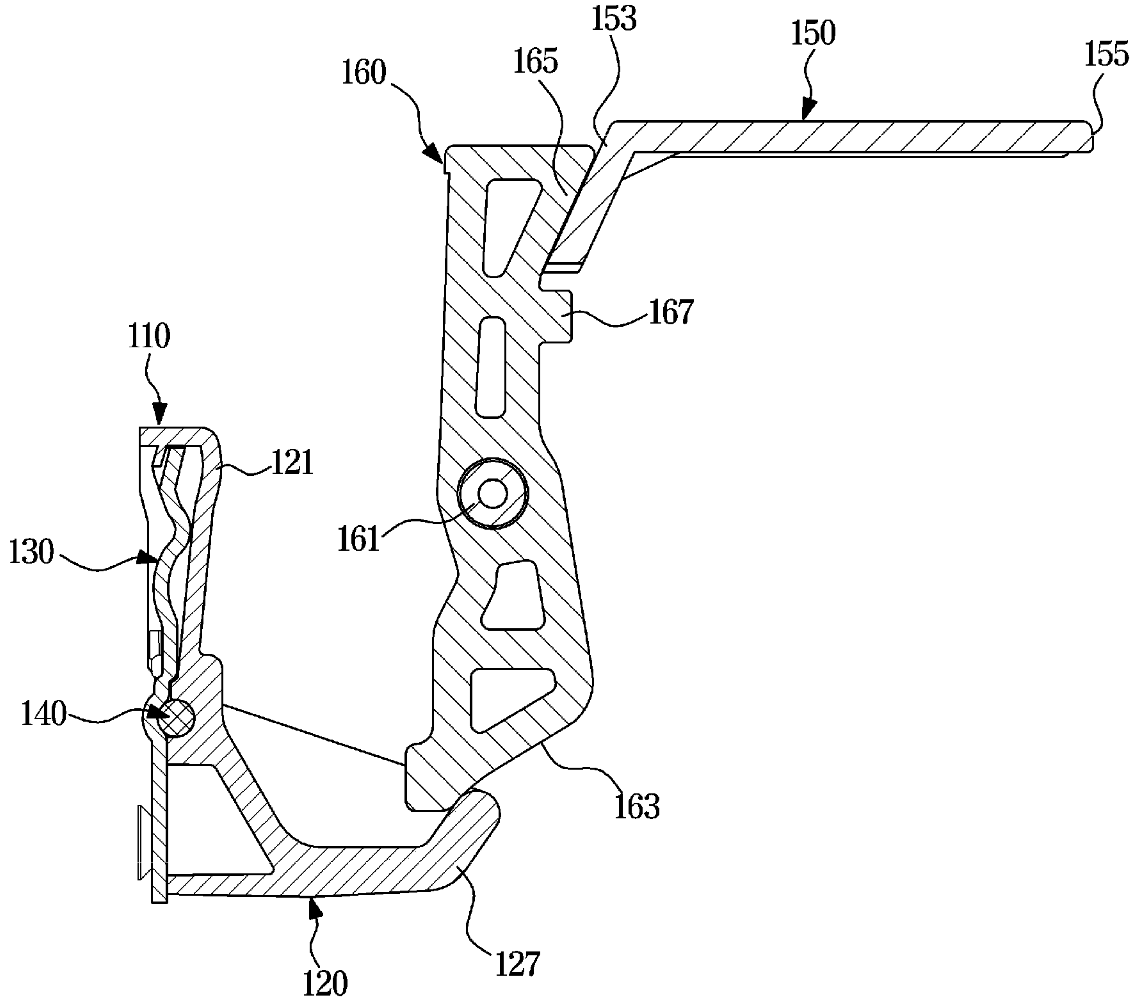
FIG. 16 is a cross-sectional view of a door opening device in a closed state of a drawer type door according to an embodiment of the disclosure.
Figure 17:
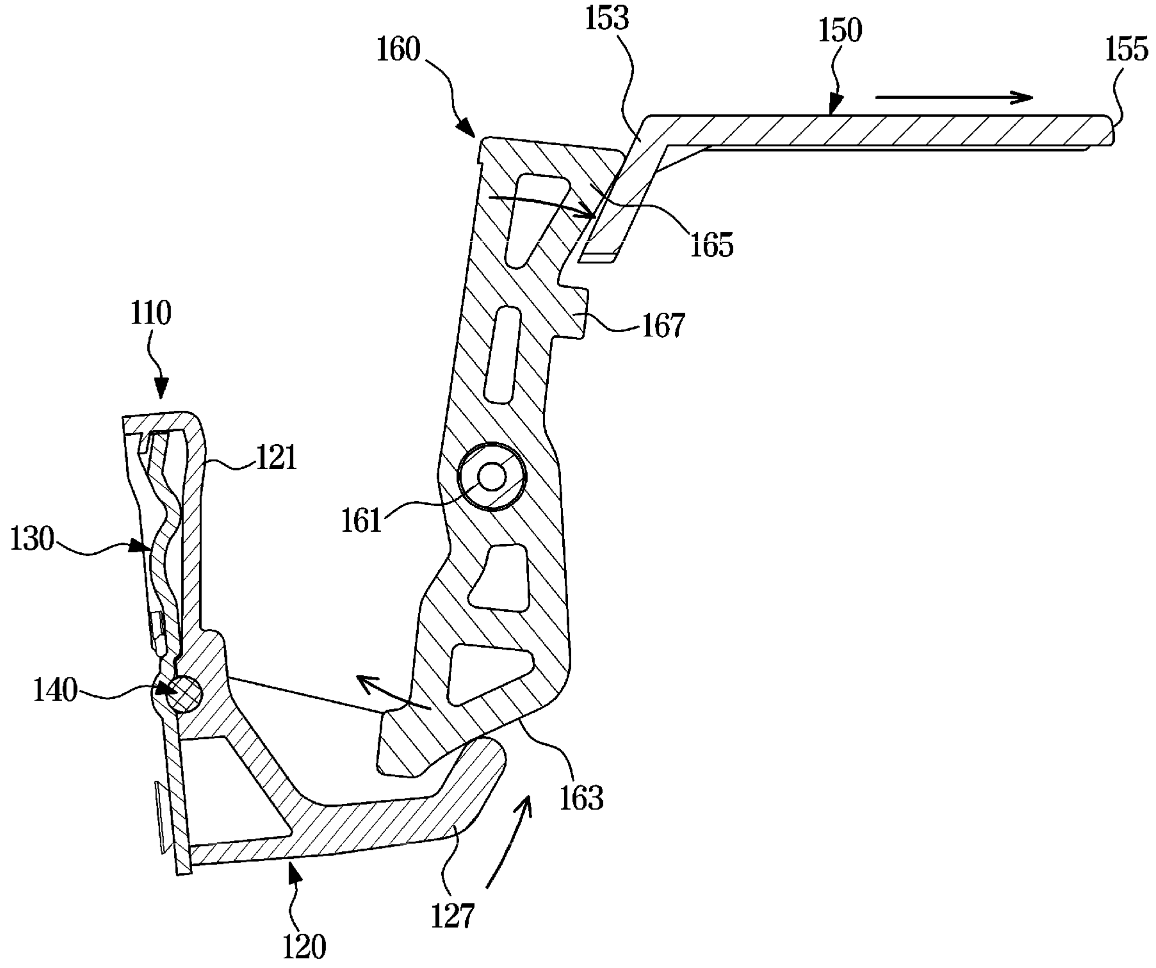
FIG. 17 is a cross-sectional view showing an initial operation of a door opening device according to a rotation of a handle lever according to an embodiment of the disclosure.
Figure 18:
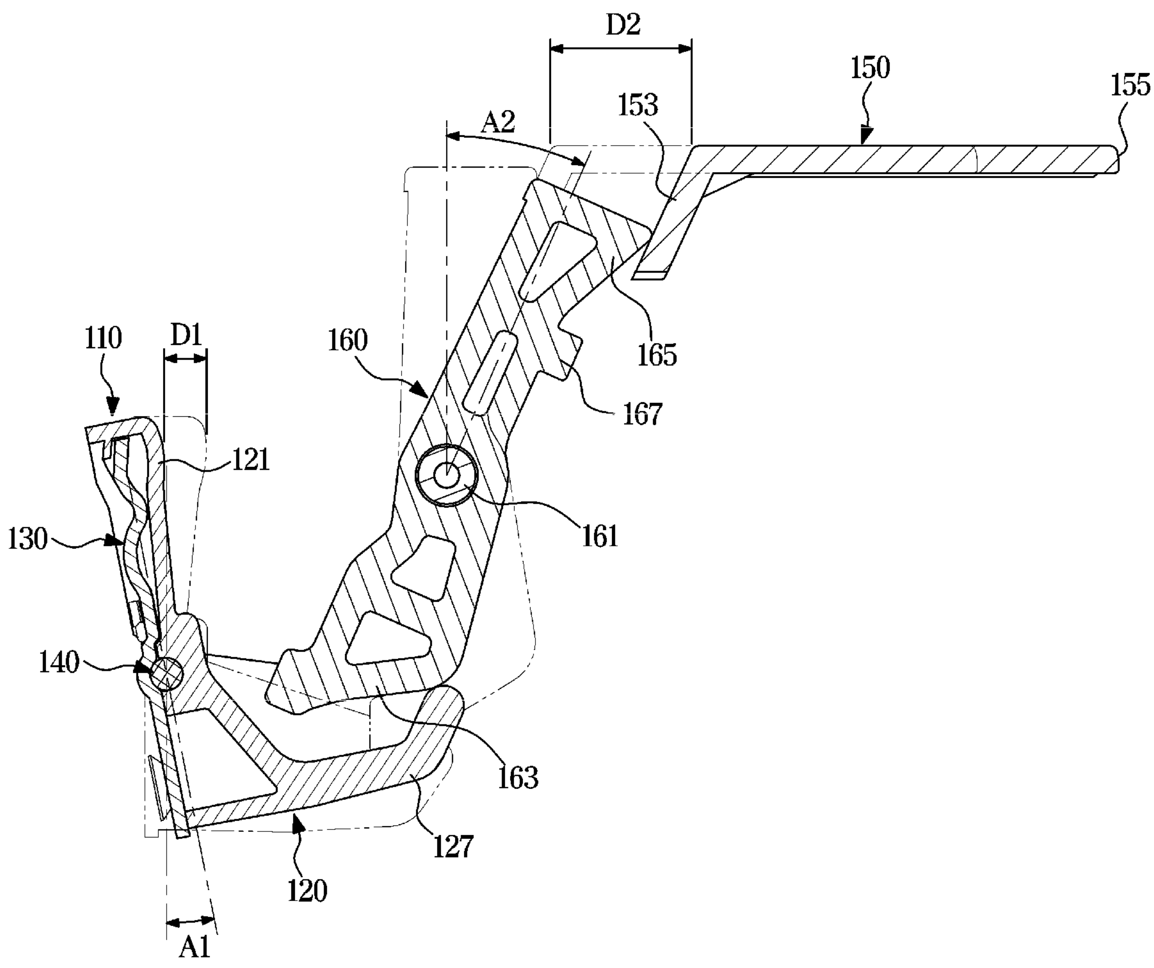
FIG. 18 is a cross-sectional view showing a full operation of a door opening device according to a rotation of a handle lever according to an embodiment of the disclosure.
Figure 19:
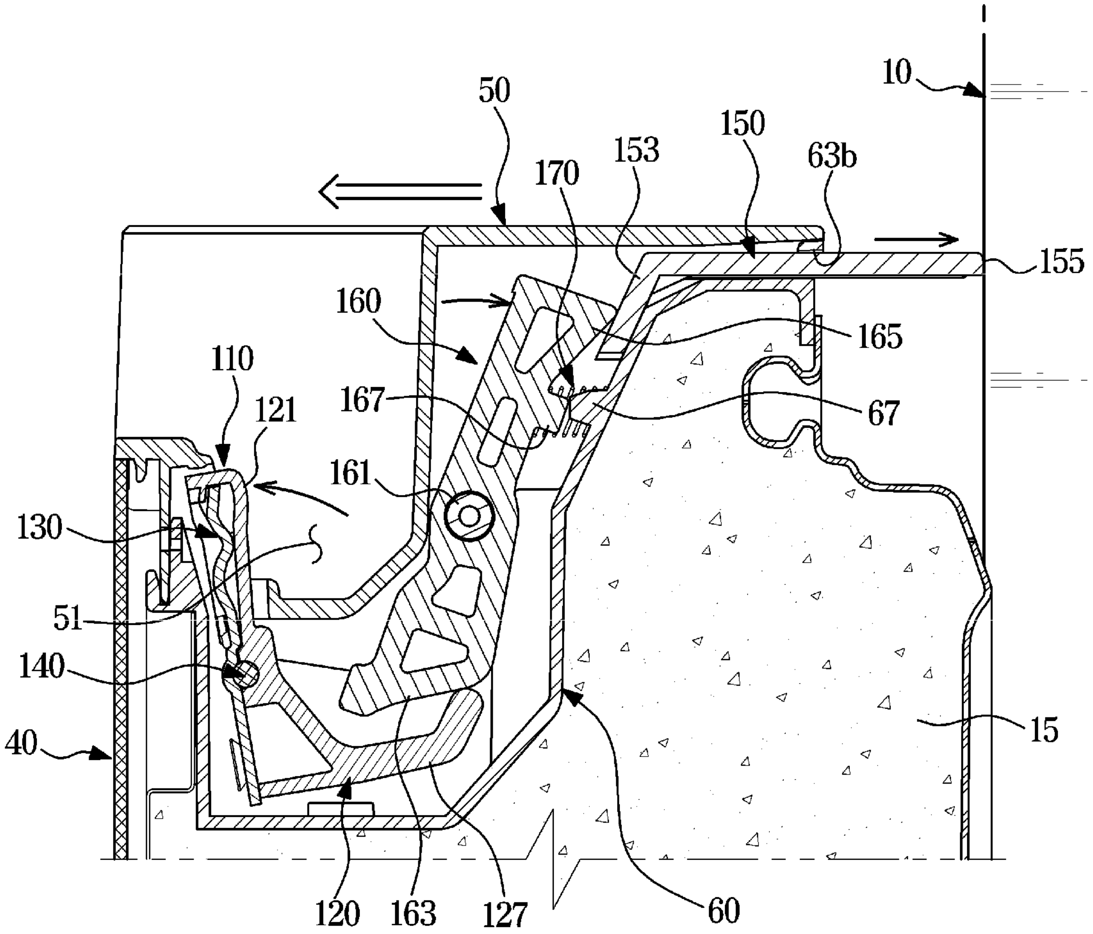
FIG. 19 is a cross-sectional view showing an open state of a drawer type door according to a full operation of a door opening device according to an embodiment of the disclosure.

FIG. 15 shows a closed state of a drawer type door assembled with a door opening device according to an embodiment of the disclosure. FIG. 16 is a cross sectional view of a door opening device in a closed state of a drawer type door according to an embodiment of the disclosure. FIG. 17 is a cross-sectional view showing an initial operation of a door opening device according to a rotation of a handle lever according to an embodiment of the disclosure. FIG. 18 is a cross-sectional view showing a full operation of a door opening device according to a rotation of a handle lever according to an embodiment of the disclosure. FIG. 19 is a cross sectional view showing an open state of a drawer type door according to a full operation of a door opening device according to an embodiment of the disclosure.

As shown in FIGS. 15 and 16, in a closed state of the drawer type door 40, the pressing portion 155 of the slider 150 may be in contact with the main body 10. In this case, the pressing portion 155 of the slider 150 may be in contact with the main body 10 without pressing the main body 10. That is, the transfer lever 160 may have rotated to the maximum in a counterclockwise direction on the transfer lever rotation shaft 161 by an elastic force of the elastic member 170. Because the transfer lever 160 has rotated to the maximum in the counterclockwise direction on the transfer lever rotation shaft 161, the pressing portion 155 of the slider 150 may be in contact with the main body 10 without pressing the main body 10.

As shown in FIG. 17, upon pressing of the handle lever 110 by a user, the handle lever 110 may rotate in the counterclockwise direction on the handle lever rotation shaft 140. As a result of the rotation in counterclockwise direction of the handle lever 110 on the handle lever rotation shaft 140, the rotating and pressing portion 127 of the handle lever 110 may slidingly move along the sliding surface 163 of the transfer lever 160. According to the sliding movement of the rotating and pressing portion 127 along the inclined sliding surface 163, the transfer lever 160 may rotate in a clockwise direction on the transfer lever rotation shaft 161. According to the rotation in clockwise direction of the transfer lever 160 on the transfer lever rotation shaft 161, the push portion 165 of the transfer lever 160 may push the pushed portion 153 of the slider 150.

As shown in FIGS. 18 and 19, upon full pressing of the handle lever 110 by a user, the handle lever 110 may rotate by an angle of A1 in the counterclockwise direction on the handle lever rotation shaft 140. At this time, the handle lever 110 may move by a distance of D1 toward the front direction from a position of the handle lever 110 before the handle lever 110 rotates.

As a result of the rotation in counterclockwise direction of the handle lever 110 on the handle lever rotation shaft 140, the rotating and pressing portion 127 of the handle lever 110 may slidingly move up to an end of the sliding surface 163 of the transfer lever 160 along the sliding surface 163. The end of the rotating and pressing portion 127 may be in a shape of a cylinder to be in linear contact with the sliding surface 163. Because the end of the rotating and pressing portion 127, being in linear contact with the sliding surface 163, moves along the sliding surface 163 to rotate the transfer lever 160, the transfer lever 160 may rotate to a greater angle than the handle lever 110. That is, the transfer lever 160 may rotate by an angle of A2 in the clockwise direction on the transfer lever rotation shaft 161. The angle of A2 by which the transfer lever 160 rotates may be greater than the angle of A1 by which the handle lever 110 rotates.

As a result of the rotation in clockwise direction by the angle of A2 of the transfer lever 160 on the transfer lever rotation shaft 161, the push portion 165 of the transfer lever 160 may push the pushed portion 153 of the slider 150 to cause the slider 150 to linearly move in a direction toward the main body 10. At this time, the slider 150 may move by a distance of D2 toward the main body 10. The distance of D2 by which the slider 150 moves may be greater than the distance of D1 by which the handle lever 110 moves. According to the linear movement of the slider 150 toward the main body 10, the pressing portion 155 may press the main body 10. According to the pressing of the main body 10 by the slider 150, the drawer type door 40 may move toward the front direction to open. That is, the drawer type door 40 may move in a direction away from the main body 10 to open. According to the rotation in clockwise direction of the transfer lever 160 on the transfer lever rotation shaft 161, the elastic member 170 may be compressed.

As described above, because, according to a rotation of the handle lever 110, the rotating and pressing portion 127 of the handle lever 110, being in a shape of a cylinder, slidingly moves along the inclined sliding surface 163 of the transfer lever 160 to rotate the transfer lever 160, the transfer lever 160 may rotate by the angle of A2 that is greater than the angle of A1 by which the handle lever 110 rotates. Also, the slider 150 may move by the distance of D2 that is greater than the distance of D1 by which the handle lever 110 moves. That is, because an operation of the slider 150 is maximized with a minimal operation of the handle lever 110, the door opening device 100 may be efficiently used within a small space.

Figure 20:
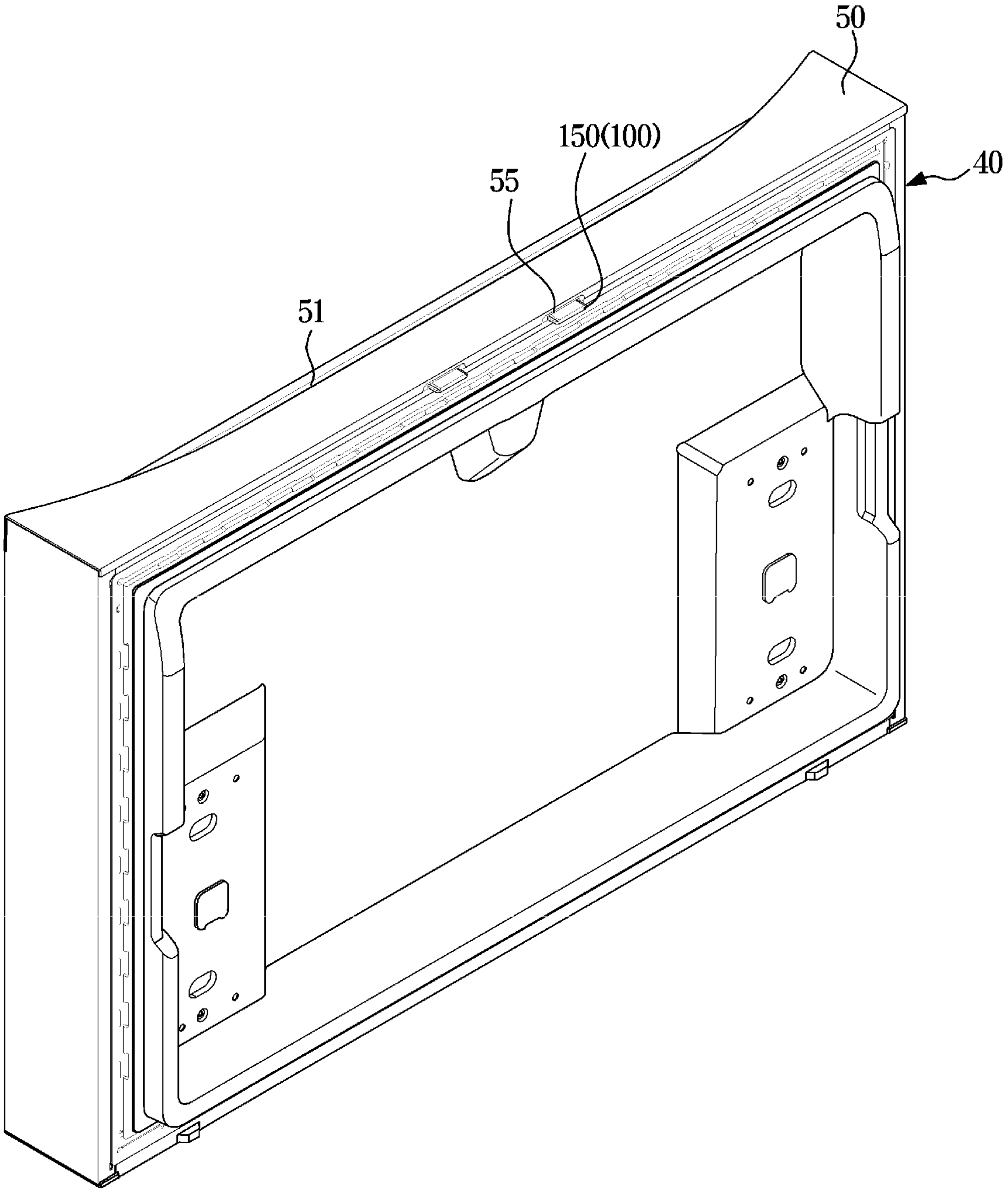
FIG. 20 shows a drawer type door assembled with a door opening device including two sliders according to an embodiment of the disclosure.
Figure 21:
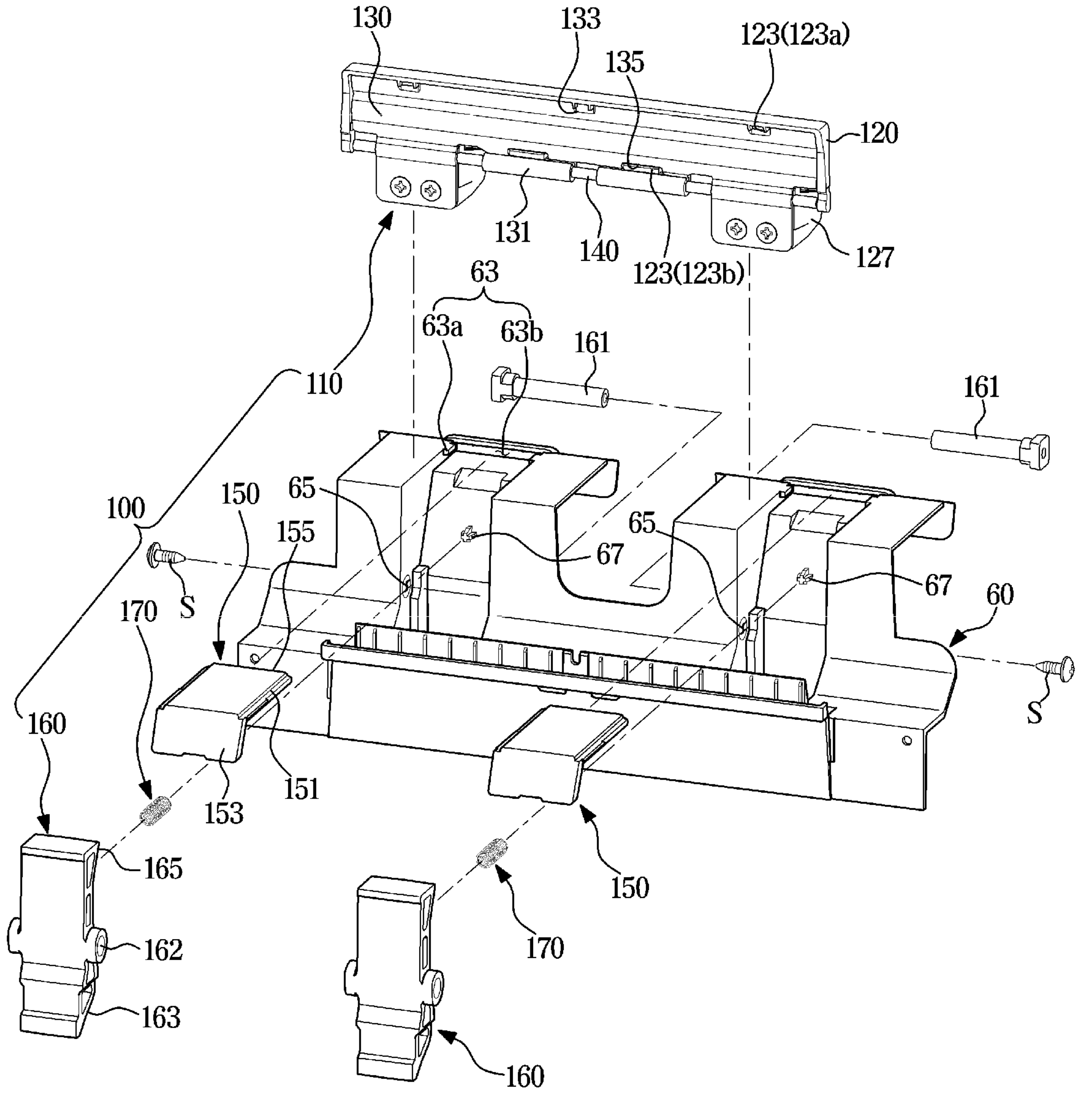
FIG. 21 shows a state in which the door opening device shown in FIG. 20 is assembled with a door bracket.

FIG. 20 shows a drawer type door assembled with a door opening device including two sliders according to an embodiment of the disclosure. FIG. 21 shows a state in which the door opening device shown in FIG. 20 is assembled with a door bracket.

As shown in FIGS. 20 and 21, sliders 150 may be provided respectively at left and right sides of the door bracket 60 with respect to a center of the door bracket 60. That is, a pair of sliders 150 may be provided. Because the pair of sliders 150 is provided, a pair of transfer levers 160 may be provided to move the sliders 150. Because the pair of sliders 150 and the pair of transfer levers 160 are provided, a pair of rotating and pressing portions 127 of the handle lever 110 may be provided to correspond to the pair of sliders 150 and the pair of transfer levers 160. Also, a pair of elastic members 170 may be provided. Also, to correspond to a pair of door opening devices 100, some components of the door bracket 60, with which the door opening devices 100 are assembled, may also be provided as a pair of pieces. Also, to linearly move the sliders 150, a pair of second openings 55 may be formed in the door cap 50. As described above, although some of components of the door opening device 100 are provided as a pair of pieces, the other components may be the same as those of the door opening device 100 shown in FIG. 5. That is, although some components of the door opening device 100 are provided as a pair of pieces, the remaining components may be the same as those described above.

As described above, because the pair of sliders 150 is provided, the door opening device 100 may operate more stably to open the drawer type door 40. That is, because the pair of sliders 150 presses the main body 10, the drawer type door 40 may open stably without failure.

Figure 22:
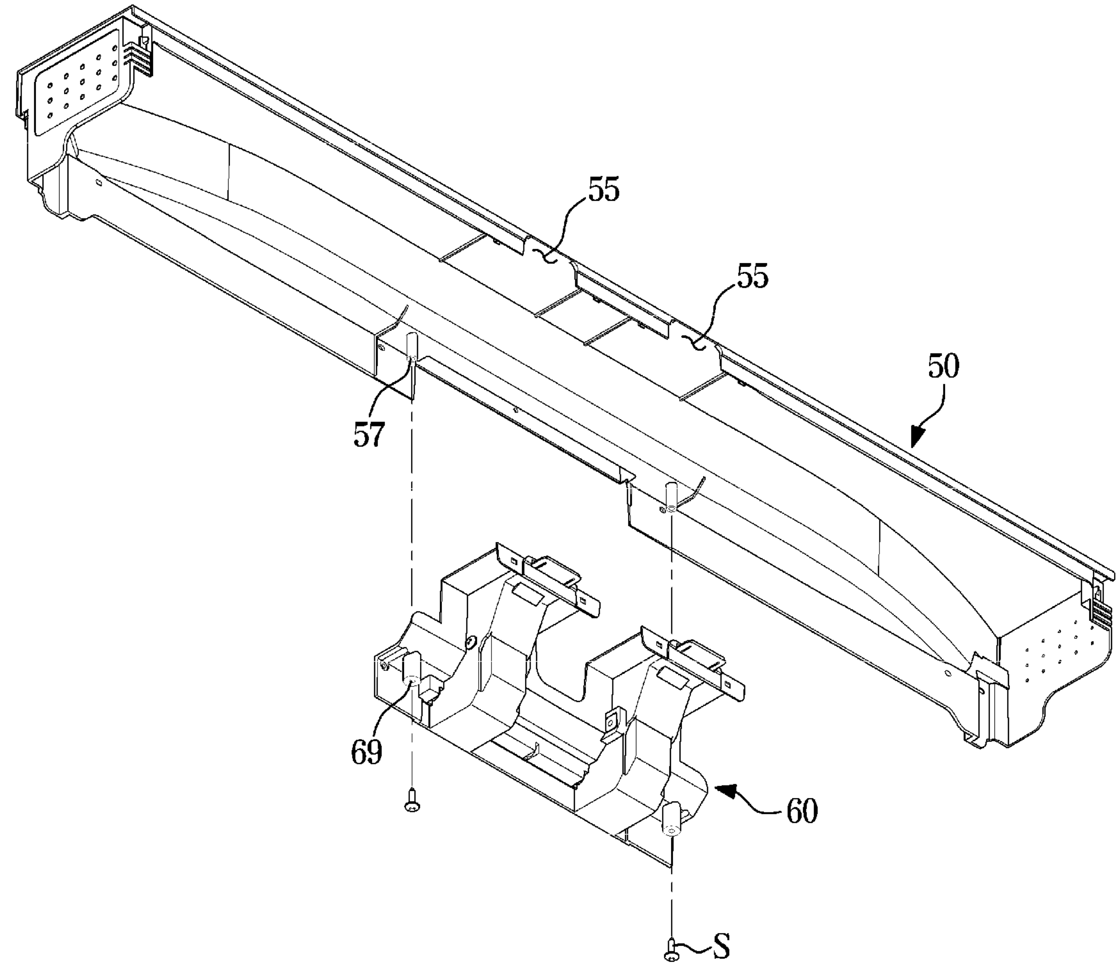
FIG. 22 shows a state in which a door bracket assembled with a door opening device according to an embodiment of the disclosure is assembled with a lower end of a door cap.

FIG. 22 shows a state in which a door bracket assembled with a door opening device according to an embodiment of the disclosure is assembled with a lower end of a door cap.

As shown in FIG. 22, except that some components of the door opening device 100 are provided as a pair of components and thus some components of the door bracket 60 are provided as a pair of components, the remaining components may be the same as those by which the door bracket 60 shown in FIG. 13 is assembled with the lower end of the door cap 50.

Figure 23:
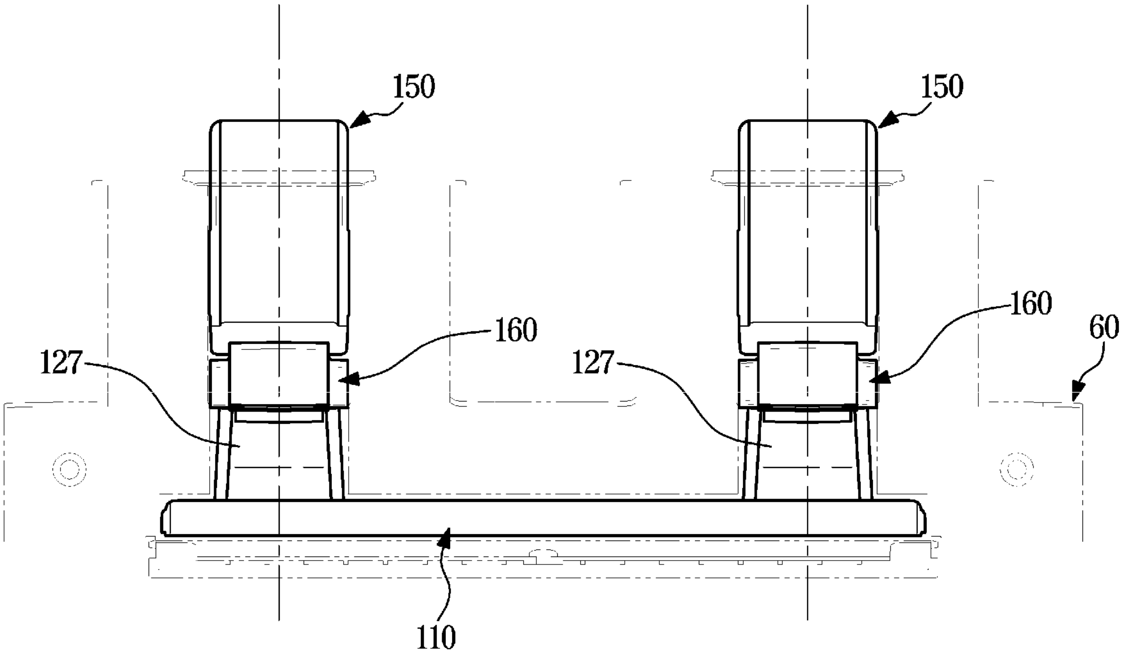
FIG. 23 shows a state in which centers of a rotating and pressing portion, a transfer lever, and a slider, according to an embodiment of the disclosure, are aligned on the same line.

FIG. 23 shows a state in which centers of a rotating and pressing portion, a transfer lever, and a slider, according to an embodiment of the disclosure, are aligned on the same line.

As shown in FIG. 3, centers of the rotating and pressing portion 127, the transfer lever 160, and the slider 150 may be aligned on the same line. Because the centers of the rotating and pressing portion 127, the transfer lever 160, and the slider 150 are positioned on a straight line, a moving distance of the slider 150 may be prevented from being reduced by bending of the handle lever 110.

According to the embodiments of the disclosure, the door opening device for opening the drawer type door with the recess type handle may operate efficiently even within a small space.

Also, the door opening device may be prevented from being exposed to the outside, resulting in an improvement of appearance.

While the above descriptions about the door opening device and the refrigerator having the same, given with reference to the accompanying drawings, are based on specific shapes and directions, various modifications and changes may be made by those of skilled in the art, and such various modification and changes should be interpreted to be included in the scope of rights of the disclosure.

What is claimed is:

1. A refrigerator comprising:
- a main body;
- a storage room formed inside the main body and having an opening formed along a front side of the main body;
- a drawer type door couplable with the main body and slideable along the storage room to open or close the opening of the storage room, the drawer type door including a door cap having a handle pocket; and
- a door opening device connectable with a portion of the door cap, and configured to open the drawer type door, wherein the door opening device includes:
- a handle lever connectable with the door cap so as to be rotatable, and including:
  - a rotating and pressing portion, and
  - a grip portion exposed in the handle pocket in a direction facing a rear of the drawer type door, and configured to be pressed into the drawer type door to rotate the handle lever in a first rotation direction,
- a transfer lever positioned behind the handle lever and rotatable by rotation of the handle lever, the transfer lever including a sliding surface inclined such that, when the handle lever is rotated in the first rotation direction, the rotating and pressing portion slides along the sliding surface to rotate the transfer lever in a second rotation direction that is opposite to the first rotation direction, and
- a slider connectable with a rear portion of the transfer lever in such a way as to be linearly movable, and configured to linearly move toward a rear direction according to the rotation of the transfer lever in the second rotation direction to press the main body, and thereby open the drawer type door, and wherein the handle lever includes:
- a bracket of which a portion is exposed to the handle pocket,
- a reinforcing member connectable with the bracket and configured to reinforce the bracket, and
- a handle lever rotation shaft fixed to the reinforcing member and configured to enable the handle lever to be rotatably connectable with the door cap.

2. The refrigerator of claim 1, wherein a door bracket is connectable with a center portion of a lower end of the door cap, and the door opening device is connectable with the door bracket.

3. The refrigerator of claim 2, wherein the door bracket includes:
- a handle lever assembling portion to which the handle lever is rotatably connectable,
- a slider assembling portion with which the slider is connectable to in such a way as to be linearly movable, and
- a transfer lever assembling hole connectable to the transfer lever.

4. The refrigerator of claim 3, wherein the slider assembling portion includes
- a guide protrusion configured to guide the slider to linearly move, and
- an opening of the slider assembling portion configured to enable the slider to linearly move to press the main body.

5. The refrigerator of claim 4, wherein the door opening device includes an elastic member having a first end supported on the transfer lever, and a second end supported on the door bracket, the elastic member configured to return the handle lever to an original position upon removal of a force applied to the handle lever after the transfer lever is rotated by the handle lever.

6. The refrigerator of claim 5, wherein the door cap includes:

a first opening configured to expose a portion of the handle lever to the handle pocket, and a second opening formed at a location corresponding to the opening of the door bracket and configured to enable the slider to linearly move to open the drawer type door.

7. The refrigerator of claim 1, wherein the bracket includes:

the grip portion exposed to the handle pocket, a plurality of catching hooks with which the reinforcing member is assembled to the bracket.

8. The refrigerator of claim 1, wherein an end of the rotating and pressing portion is in a shape of a cylinder to be in linear contact with the sliding surface.

9. The refrigerator of claim 4, wherein the slider includes:

a guide rail guided by the guide protrusion, a pushed portion configured to be pushed by the transfer lever to linearly move the slider toward the main body, and a pressing portion configured to press the main body through the opening of the slider assembling portion upon a linear movement of the slider toward the main body to open the drawer type door.

10. The refrigerator of claim 5, wherein the transfer lever includes:

a transfer lever rotation shaft fixable to the transfer lever assembling hole, a rotation hole rotatably fixable to the transfer lever rotation shaft, a push portion configured to push the slider, and a first support protrusion on which the first end of the elastic member is supported, and wherein the door bracket includes a second support protrusion on which the second end of the elastic member is supported.

11. The refrigerator of claim 1, wherein a center of the handle lever, a center of the transfer lever, and a center of the slider are aligned along an axis.

12. The refrigerator of claim 3, wherein the slider and the transfer lever are provided at a left side and a right side of the door bracket with respect to a center of the door bracket.

13. The refrigerator of claim 12, wherein the rotating and pressing portion of the handle lever is provided as a pair of pieces to correspond to the transfer lever.

14. The refrigerator of claim 13, wherein a center of the rotating and pressing portion, a center of the transfer lever, and a center of the slider are aligned along an axis.

* * * * *